United States Patent
Nishiguchi et al.

(10) Patent No.: US 10,535,483 B2
(45) Date of Patent: Jan. 14, 2020

(54) ELECTROMAGNETIC RELAY DEVICE

(71) Applicants: SOKEN, INC., Nishio, Aichi-pref. (JP); DENSO CORPORATION, Kariya, Aichi-pref. (JP); ANDEN CO., LTD., Anjo, Aichi-pref. (JP)

(72) Inventors: Yoshitaka Nishiguchi, Nishio (JP); Takahiro Soki, Kariya (JP); Hiroaki Murakami, Anjo (JP); Masanao Sugisawa, Anjo (JP)

(73) Assignees: SOKEN, INC., Nishio (JP); DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 147 days.

(21) Appl. No.: 15/904,792

(22) Filed: Feb. 26, 2018

(65) Prior Publication Data

US 2018/0247781 A1    Aug. 30, 2018

(30) Foreign Application Priority Data

Feb. 28, 2017  (JP) ................................ 2017-036128
Aug. 9, 2017   (JP) ................................ 2017-153986

(51) Int. Cl.
| | |
|---|---|
| *H01H 50/18* | (2006.01) |
| *H01H 50/36* | (2006.01) |
| *H01H 50/44* | (2006.01) |
| *H01H 50/54* | (2006.01) |

(52) U.S. Cl.
CPC ............ *H01H 50/18* (2013.01); *H01H 50/36* (2013.01); *H01H 50/44* (2013.01); *H01H 50/54* (2013.01); *H01H 2221/036* (2013.01); *H01H 2235/01* (2013.01)

(58) Field of Classification Search
CPC ......... H01H 50/18; H01H 50/36; H01H 50/44
See application file for complete search history.

(56) References Cited

U.S. PATENT DOCUMENTS

| | | | |
|---|---|---|---|
| 6,791,442 B1 * | 9/2004 | Schmidt | ................ H01F 7/1615 335/220 |
| 2012/0105178 A1 | 5/2012 | Niimi | |
| 2016/0225565 A1 | 8/2016 | Sugisawa et al. | |
| 2019/0221392 A1 * | 7/2019 | Nishiguchi | ............ H01H 50/14 |

* cited by examiner

*Primary Examiner* — Bernard Rojas
(74) *Attorney, Agent, or Firm* — Oliff PLC

(57) ABSTRACT

In an electromagnetic relay device, a stationary core is coaxially arranged in an exciting coil, and constitutes a magnetic circuit. A yoke is arranged to surround an outer periphery of the exciting coil and the second end of the exciting coil to constitute the magnetic circuit. The yoke has an opening that is located to be closer to the first end of the exciting coil than to the second end of the exciting coil, and that faces the stationary core. A movable core is located to face the stationary core via the opening. The movable core is pulled to the stationary core upon the exciting coil being energized. A return spring is made of a magnetic member that is volutely wound in an axial direction of the stationary core. The return spring urges the movable core to be separated from the stationary core.

14 Claims, 12 Drawing Sheets

ELECTROMAGNETIC RELAY DEVICE

CROSS REFERENCE TO RELATED APPLICATIONS

This application is based on and claims the benefit of priority from Japanese Patent Application 2017-36128 filed on Feb. 28, 2017 and Japanese Patent Application 2017-153986 filed on Aug. 9, 2017, the disclosure of each of which is incorporated in its entirety herein by reference.

TECHNICAL FIELD

The present disclosure relates to electromagnetic relay devices for opening or closing an electric circuit.

BACKGROUND

Electromagnetic relay devices are configured to bring a movable core closer to a stationary core or separate the movable core from the stationary core to thereby contact or separate movable and stationary contacts.

For example, a plunger electromagnetic solenoid, as an example of these electromagnetic relay devices, is disclosed in Japanese Patent Application Publication No. 2012-94435, which is referred to as a published patent document. The plunger electromagnetic solenoid includes a plunger, an exciting coil, a hollow cylindrical stationary core, a hollow cylindrical movable core, and a coil spring as an example of a return spring. The movable core has a first end, a main body, and a second end in its axial direction. The exciting coil is arranged to surround the stationary core. The coil spring is made of a magnetic material and is comprised of a plurality of loops arranged in its axial direction. The coil spring is interposed between the main part of the movable core and the stationary core such that the first end of the movable core, which projects from a corresponding first end of the main part, is located in the coil spring; a second end of the main part is connected to the second end of the movable core.

The coil spring has opposing first and second ends, the first end of the coil spring is mounted to be fitted in a fitting groove formed in the outer peripheral portion of the first end of the main part of the movable core, resulting in the first end of the coil spring being restrained to the movable core.

The outer periphery of the first end of the movable core is tapered from the outer peripheral portion of the first end of the main part of the movable core toward the stationary core. The stationary core has a groove facing the first end of the movable core. The first end of the movable core has an outer end surface facing the stationary core. The groove of the stationary core has a tapered inner periphery conforming to the tapered outer periphery of the first end of the movable core.

The tapered outer periphery of the first end of the movable core, which is to be abutted onto the tapered inner periphery of the stationary core, is located more inwardly than the fitting groove of the outer peripheral portion of the main part of the movable core. The coil spring urges the movable core to be separated, i.e. returned, from the stationary core to its original position. When energized based on a predetermined voltage, the exciting coil pulls the movable core toward the stationary core against the urging force of the coil spring, so that the end surface of the first end of the movable core is abutted onto the stationary core.

The above configuration of the plunger electromagnetic solenoid prevents the end surface of the first end of the movable core from interfering with the coil spring when the exciting coil is energized based on the predetermined voltage. This enables the voltage applied to the exciting coil to be stable. Because the coil spring is made of a magnetic material, adjacent loops in the axial direction of the coil spring pull each other based on the magnetic force generated by the energized exciting coil. This results in the movable core being more easily pulled to the stationary core to thereby reduce a level of the voltage applied to the exciting coil as compared with a case where the coil spring is made of a non-magnetic material.

SUMMARY

The coil spring made of a magnetic material may however result in radially inward magnetic force, i.e. side force, being generated between a portion of the coil spring, which surrounds the tapered portion of the movable core, and the tapered portion of the movable core; the radially inward magnetic force has a radially inward direction. This may result in the axial direction of the coil spring being inclined relative to the axial direction of the stationary core.

In view of the circumstances set forth above, an exemplary aspect of the present disclosure seeks to provide electromagnetic relay devices, each of which includes a return spring. Each of the electromagnetic relay devices according to the exemplary aspect is capable of reducing radially inward magnetic force applied to the return spring.

According to an exemplary aspect of the present disclosure, there is provided an electromagnetic relay device. The electromagnetic relay device includes an exciting coil having opposing first and second ends in an axial direction thereof and configured to generate magnetic flux upon being energized, and a stationary core coaxially arranged in the exciting coil and constituting a magnetic circuit. The electromagnetic relay device includes a yoke arranged to surround an outer periphery of the exciting coil and the second end of the exciting coil to constitute the magnetic circuit. The yoke has an opening that is located to be closer to the first end of the exciting coil than to the second end of the exciting coil, and that faces the stationary core. The electromagnetic relay device includes a movable core located to face the stationary core via the opening. The movable core is configured to be pulled to the stationary core upon the exciting coil being energized. electromagnetic relay device includes a return spring made of a magnetic member that is volutely wound in an axial direction of the stationary core. The return spring constitutes the magnetic circuit and is configured to urge the movable core to be separated from the stationary core.

Upon the exciting coil being energized, the return spring is configured such that volute flow of a component of the magnetic flux becomes saturated to cause leakage flux components to be leaked out from the return spring. The leakage flux components cause magnetic attractive force to be between the return spring and the movable core, and between the return spring and the stationary core. That is, the magnetic attractive force serves as force to shrink the return spring, resulting in apparent reaction force of the return spring to be weakened, thus relatively increasing the magnetic attractive force that pulls the movable core to the stationary core.

Because a major part of the magnetic attractive force is in the axial direction of the return spring, radial magnetic force including inward magnetic force, i.e. side force, which acts on the return spring, is reduced. This reduces inclination of the axial direction of the return spring relative to the axial direction of the stationary core.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENT

Figure 1:
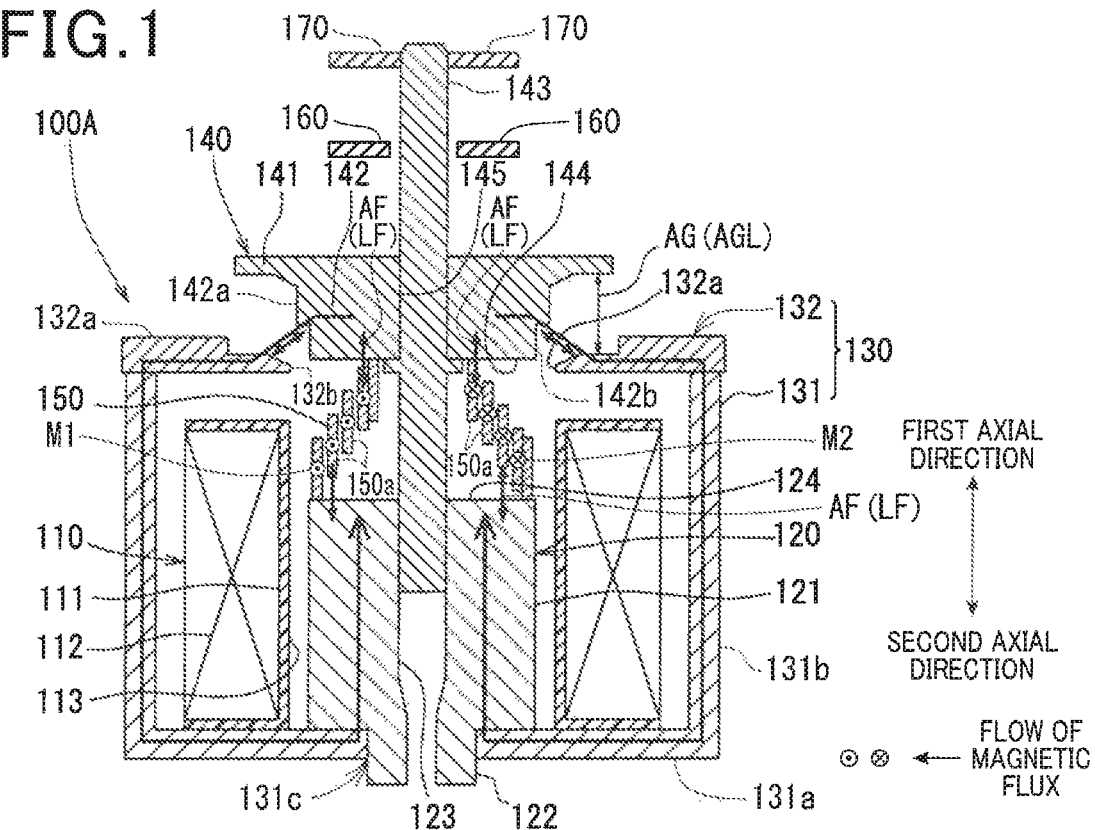
FIG. 1 is an axial cross-sectional view of an electromagnetic relay device while an air gap of the electromagnetic relay device has a maximum length according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description. If the structure of one portion of at least one embodiment is only described, this means that the structure of the other portions of the at least one embodiment has been already described in at least one of the other embodiments. The embodiments described below can be at least partly combined with each other as long as combined embodiments cause a problem in the scope of the present disclosure.

First Embodiment

The following describes an electromagnetic relay device 100A according to the first embodiment with reference to FIGS. 1 to 5.

Referring to FIGS. 1 to 3A, the electromagnetic relay device 100A serves to supply electrical power to at least one predetermined device, i.e. at least one electrical load, and interrupt the supply of electrical power to the at least one predetermined device. For example, the electromagnetic relay device 100A is applied to an inverter, installed in a vehicle, such as a hybrid vehicle or an electrical vehicle. The inverter is configured to convert direct-current (DC) power supplied from, for example, a battery into alternating-current (AC) power, and supply the AC power to a drive motor installed in the vehicle; the drive motor serves as, for example, a main engine for moving the vehicle. The electromagnetic relay device 100A is electrically interposed between the battery and the inverter.

The electromagnetic relay device 100A includes an unillustrated case having, for example, a substantially hollow cylindrical shape. The unillustrated case has first and second end walls opposite to each other, and a cylindrical sidewall.

The electromagnetic relay device 10A also includes, for example, an exciting coil 110, a stationary core 120, a yoke assembly 130, a movable core 140, and a return spring 150; these components constitute a main part of the electromagnetic relay device 10A. These components 110, 120, 130, 140, and 150 are installed in the case. The case is made of, for example, a resin material, and a base, which is made of, for example, a resin material, is installed in the case to hold these components 110, 120, 130, 140, and 150. For example, the base is fixed to the inner surface of the case with, for example, by adhesion or fixed to the inner surface of the case such that hooks attached to the base are fitted in corresponding grooves formed in the inner surface of the case.

The yoke assembly 130, serving as a yoke, has a substantially hollow cylindrical storage space in which the exciting coil 110, the stationary core 120, and the return spring 150 is stored.

As described below, the exciting coil 110 is coaxially installed in the yoke assembly 130.

Each of the exciting coil 110 and the yoke assembly 130 has a first axial direction corresponding to the upper direction in FIG. 1, and a second axial direction corresponding to the lower direction in FIG. 1. Each of the first and second axial directions serves as a reference direction. The first and second axial directions are collectively called an axial direction.

As described below, the movable core 140 and the stationary core 120 are axially arranged such that the movable core 140 is located at the first axial-direction side of the stationary core 120, that is, the stationary core 140 is located at the second axial-direction side of the movable core 140. The first end wall of the case is located at the first axial-direction side of the second end wall of the case. Hereinafter, the first axial-direction side will be referred to simply as a first axial side, and the second axial-direction side will be referred to simply as a second axial side.

The yoke assembly 130 is comprised of a first yoke 131 and a second yoke 132. The first yoke 131 has a substantially annular cylindrical shape with a first opening end wall. The first yoke 131 has a second annular end wall 131a, which is opposite to the first opening end wall, coaxially mounted on a second end wall of the case. The first yoke 131 also has a cylindrical sidewall 131b continuously extending in the first axial direction from the outer periphery of the second annular end wall 131a. For example, bending a magnetic metallic strip to have a substantially annular cylindrical shape with one opening end wall enables the first yoke 131 to be formed. The second annular end wall 131a has a through hole 131c thereinside.

The second yoke 132, which is made of, for example, a magnetic metallic material, is comprised of an annular base plate 132a having a stepwise inner diameter increase in the second axial direction. That is, the second yoke 132 includes an inner flange 132b inwardly extending from a second axial-side edge of the inner periphery of the annular base plate 132a to provide a circular space 132c around the extending end of the inner flange 132b. The second yoke 132 is mounted to the first opening end wall of the first yoke 131 such that the outer periphery of the annular base plate 132a of the second yoke 132 is joined to the first axial-side edge of the sidewall 131b of the first yoke 131.

The electromagnetic relay device 10A includes a substantially annular cylindrical coil assembly 110 coaxially mounted on the second annular end wall 131b of the first yoke 131. The coil assembly 110, which has opposing first and second ends, includes a substantially annular cylindrical bobbin 111 and a substantially annular cylindrical coil 112.

Specifically, the bobbin 111, which is made of, for example, a resin material, is comprised of a tubular portion, an annular plate-like first flange that continuously extends from the first axial-side edge of the tubular portion, and an annular plate-like second first flange that continuously extends from the second axial-side edge of the tubular portion. The annular cylindrical exciting coil 112 is wound around the outer circumferential surface of the tubular portion of the bobbin 111 in the circumferential direction of the tubular portion of the bobbin 111. The coil 112 is configured to produce a magnetic field when energized.

The bobbin 111 has an inner space inside the inner periphery of the tubular portion of the bobbin 111; the inner space serves as a coil center hole 113 arranged to be coaxial with the yoke assembly 130.

The stationary core 120 has a substantially annular cylindrical shape, and is located on the second annular end wall 131a to be coaxial with the yoke assembly 130. The stationary core 120 is made of, for example, a magnetic metallic material. The stationary core 120 and the yoke assembly 130 serve as a magnetic circuit.

Specifically, the stationary core 120 is comprised of a large-diameter portion 121, a small-diameter portion 122, and a center hole 123.

The large-diameter portion 121 has an annular cylindrical shape with a first annular end surface and a second annular end surface opposite to the first annular end surface. The large-diameter portion 121 is coaxially mounted at the first annular end surface on the second annular end wall 131a. The large-diameter portion 121 extends from the second annular end wall 131a in the first axial direction, and has a constant outer diameter.

The small-diameter portion 122 has an annular cylindrical shape with an outer diameter smaller than the outer diameter of the large-diameter portion 121. The small-diameter portion 122 extends coaxially from an inner portion of the second annular end surface of the large-diameter portion 121 in the second axial direction so that the extending end of the small-diameter portion 122 is fitted in the through hole 131c of the yoke assembly 131c to project therethrough. This results in the stationary core 120 being fixedly mounted to the yoke assembly 130.

The center hole 123 has been formed inside the large-diameter portion 121 and the small-diameter portion 122. That is, the center hole 123 is penetrated through the large- and small-diameter portions 121 and 122 in the axial direction of the stationary core 120. The diameter of the center hole 123 is changed in conformity with change from the outer diameter of the large-diameter portion 121 to the small-diameter portion 122.

The first annular end surface of the large-diameter portion 121 serves as a facing surface 124. That is, the facing surface 124 of the stationary core 120 is shaped as a flat surface that faces the movable core 140 described later in the first axial direction of the stationary core 120.

As described above, the yoke assembly 130 serves as the magnetic circuit together with the stationary core 120. The yoke assembly 130 is arranged to surround the outer periphery of the coil assembly 110 and the second end of the coil assembly 110.

As described above, the second yoke 132 has the circular space defined around the extending end of the inner flange 132b thereof; the circular space 132c serves as a yoke hole 132c; the yoke hole 132c faces the stationary core 120. The yoke hole 132c, which serves as, for example, an opening, has, for example, a circular shape formed to conform to the radially circular shape of the coil center hole 113. The second yoke 132 therefore covers a portion of the exciting coil 110, which faces the second yoke 132; the portion includes the first flange of the exciting coil 110 without the coil center hole 113. The yoke hole 132c is located to be closer to the first end of the coil assembly 110 than to the second end of the coil assembly 110.

The movable core 140 is arranged through the yoke hole 132c to face the stationary core 120, and is configured to be movable in the axial direction of the yoke assembly 130. That is, the movable core 140 is mainly made of a material, such as a magnetic metallic material, that can be pulled to the stationary core 120 based on magnetically attractive force generated by the exciting coil 110 when the exciting coil 110 is energized.

For example, the movable core 140 is comprised of a base portion 141, a projecting portion 142, a shaft 143, and a center hole 145.

The base portion 141 has an annular plate-like shape, and has first and second major surfaces, which are opposite to each other, extend in radial directions substantially perpendicular to the axial direction of the stationary core 120. The outer diameter of the base portion 141 is larger than the inner diameter of the yoke hole 132a.

In particular, the base portion 141 is located at the outside of the yoke assembly 130 such that the second major surface of the base portion 141 faces the second yoke 132.

The projecting portion 142 has an annular cylindrical shape, and projects from the second major surface of the base portion 141 in the second axial direction toward the stationary core 120.

Specifically, the projecting portion 142 is comprised of a first annular cylindrical portion 142a projecting in the second axial direction from the second major surface of the base portion 141, and a second annular cylindrical portion 142b projecting in the second axial direction from the first annular cylindrical portion 142a. The outer diameter of the first annular cylindrical portion 142a is larger than the outer diameter of the second annular cylindrical portion 142b, so that the projecting portion 142 has a stepwise outer diameter reduction in the second axial direction.

The center hole 145 has been formed inside the assembly of the base portion 141 and the projecting portion 142. That is, the center hole 145 is penetrated through the base portion 141 and the projecting portion 142 in the axial direction of the assembly of the base portion 141 and the projecting portion 142.

The shaft 143, which is for example made of a non-magnetic material, has, for example, a substantially circular shape in its lateral cross section. A middle portion of the shaft 143 in its axial direction is fixedly fitted in the center hole 145 of the assembly of the base portion 141 and the projecting portion 142, so that the shaft 143 is integrated with the assembly of the base portion 141 and the projecting portion 142. The integrated member of the shaft 143 and the assembly of the base portion 141 and the projecting portion 142 constitute the movable core 140.

The shaft 143 has opposing first and second end portions in the axial direction thereof. The second end portion of the shaft 143 is slidably fitted in the center hole 123 of the stationary core 120 in the axial direction of the stationary core 120. This enables the movable core 140 to be movable in the axial direction of the stationary core 123 relative to the stationary core 120 based on slidable movement of the shaft 143 in the center hole 123.

The second annular cylindrical portion 142b of the projecting portion 142 has an end surface 144 serving as a facing surface 144. The facing surface 144 of the second annular cylindrical portion 142b is shaped as a flat surface that faces the facing surface 124 of the stationary core 120 in the second axial direction of the movable core 140.

The inner flange 132b of the second yoke 132 has opposing first and second annular surfaces, and the first annular surface of the inner flange 132b faces the second major surface of the base portion 141. As described later, when the movable core 140 is brought to be closer to the stationary core 120 upon the exciting coil 112 being energized, the base portion 141 is seated onto the inner flange 132b.

The electromagnetic relay device 100A has an air gap AG defined as a minimum distance between the second major surface of the base portion 141 and the first annular surface of the inner edge 132b of the second yoke 132 in the axial direction of the movable core 140.

The return spring 150, which is made of, for example, a magnetic material, is configured as a conical spring or a volute spring that is comprised of a strip-shaped, thin-walled plate member volutely wound in its axial direction. That is, the return spring 150 has a cone-shaped with a first end and a second end in its axial direction. The return spring 150 is comprised of a volutely coiled member that provide volutely subsequent coils 150a; each subsequent coil 150a of the return spring 150 from the first end to the second end has a larger diameter. When the return spring, i.e. volute spring, 150 is under compression, the coils 150a are not forced against each other, but instead nested within each other, thus permitting longer travel and increased compactness in the compressed configuration.

The return spring 150 is coaxially arranged between the facing surface 124 of the movable core 120 and the facing surface 144 of the stationary core 140 such that (1) The first end, which corresponds to the apex of the cone shape and has a smaller diameter than the second end, is abutted onto the facing surface 144

(2) The second end, which corresponds to the bottom of the cone shape and has a larger diameter than the first end, is abutted onto the facing surface 124

The return spring 150 biases the movable core 140 in the first axial direction of the movable core 140 relative to the stationary core 120.

In particular, as illustrated in FIG. 1, the facing surface 144, i.e. the second axial-side end, of the movable core 140 urged by the return spring 144 upon the exciting coil 112 being deenergized is located to be substantially aligned with or close to the inner flange 132b of the second yoke 132. This results in the air gap AG having a predetermined maximum length AGL. The position of the movable core 140 while the air gap AG has the maximum length AGL will also be referred to as a relay-contact off position at which the stationary contacts and movable contacts described later are separated from each other.

Figure 3A:
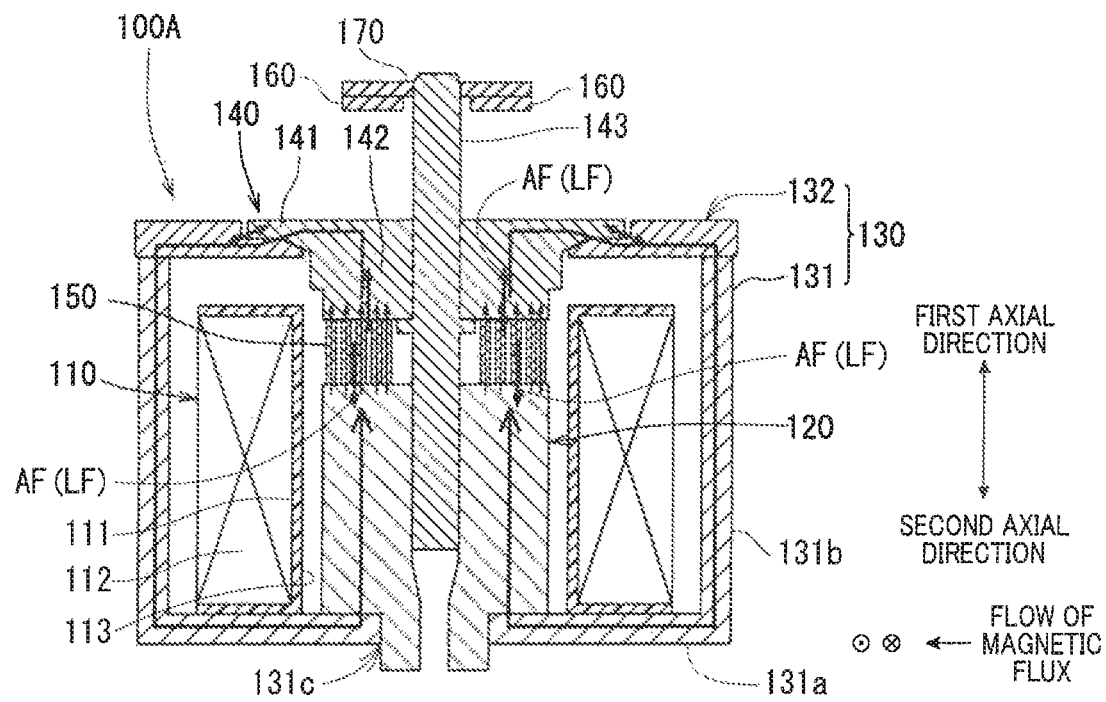
FIG. 3A is an axial cross-sectional view of the electromagnetic relay device while the air gap of the electromagnetic relay device has a minimum length according to the first embodiment.

In contrast, as illustrated in FIG. 3A, when the exciting coil 110 is energized, the movable core 140 is pulled to the stationary core 120 against the biasing force of the return spring 150, so that the return spring 150 is fully, i.e. maximally, compressed to have a tubular shape, and the base portion 141 is seated onto the inner flange 132b. This results in the air gap AG becomes a predetermined minimum length of 0 mm. Upon the air gap AG being 0 mm, the minimum distance between the facing surface 124 of the stationary core 120 and the facing surface 144 of the movable core 140 in the axial direction of the stationary core 120 becomes identical to the length of the fully compressed return spring 150 having the tubular shape; the length of the fully compressed return spring 150 having the tubular shape is defined as a minimum length of the return spring 150.

As illustrated in FIG. 1, the electromagnetic relay device 100A includes a pair of stationary contacts 160 each made of an electrically conductive material; the stationary contacts 160 are located on both sides of the shaft 143. For example, one of the stationary contacts 160 is electrically connected to the battery, and the other of the stationary contacts 160 is electrically connected to the inverter.

The electromagnetic relay device 100A also includes a pair of movable contacts 170 each made of an electrically conductive material; the movable contacts 170, which are electrically connected to each other, are mounted to the first end portion of the shaft 143 while the movable contacts 170 face the respective stationary cores 160. The movable contacts 170 are movable together with the movable core 140.

The stationary contacts 160 and the movable contacts 170 constitute a contact mechanism of the electromagnetic relay device 100A of the electromagnetic relay device 100A. Note that, in each of the other figures except for FIGS. 1 and 3, illustration of the contact mechanism of the electromagnetic relay device 100A is omitted.

That is, upon the exciting coil 110 being deenergized, the movable core 140 and the movable contacts 170 are moved in the first axial direction by the biasing force of the return spring 150, so that the movable contacts 170 are separated from the stationary contacts 160, resulting in the electromagnetic relay device 100A being off. At that time, movement of the movable core 140 in the first axial direction is stopped at a predetermined position by an unillustrated limiting member. The length between the facing surface 124 of the stationary core 120 and the facing surface 144 of the movable core 140 while the location of the movable core 140 is limited by the limiting member represents the farthest distance between the stationary core 120 and the movable core 140 in the axial direction of the stationary core 120.

When the location of the movable core 140 is limited by the limiting member so that the stationary core 120 is the farthest from the movable core 140, the air gap AG becomes the predetermined maximum length AGL; the maximum length AGL is set within the range from, for example, 2.5 mm to 3 mm inclusive.

In contrast, upon the exciting coil 110 being energized, the movable core 140 and the movable contacts 170 are attracted to the stationary core 120 by the magnetically attractive force generated by the exciting coil 110 against the biasing force of the return spring 150 in the second axial direction, so that the movable contacts 170 are contacted onto the respective stationary contacts 160 while the base portion 141 of the movable core 140 is seated onto the inner flange 132b of the yoke assembly 130 (see FIG. 3A). This results in the electromagnetic relay device 100A being turned on, so that the battery and the inverter are electrically connected to each other via the electromagnetic relay device 100A.

When the movable contacts 170 are respectively contacted onto the stationary contacts 160 and the base portion 141 of the movable core 140 is seated onto the inner flange 132b of the yoke assembly 130, the air gap AG becomes the predetermined minimum length of 0 mm (see FIG. 3A).

Next, the following describes operations of the electromagnetic relay device 100A configured set forth above with reference to FIGS. 1 to 3A.

When electrical power supply to the exciting coil 110 is shut off, i.e. no electric power is supplied to the exciting coil 110, no magnetic field is generated by the exciting coil 110, resulting in no magnetic attractive force for the movable core 140 being generated. This therefore causes the return spring 150 to move the movable core 140 up to the relay-contact off position in the first axial direction, so that the stationary contacts 160 are separated from the movable contacts 170. This results in no electrical power supply to the inverter.

In contrast, when electrical power is supplied to the exciting coil 110, the exciting coil 110 generates a magnetic field based on magnetic flux (see a solid arrow in each of FIGS. 1 to 3A) passing through the movable core 140, the yoke assembly 130, and the stationary core 120. This generates magnetic attractive force to the movable core 140, so that the movable core 140 is pulled by the generated magnetic attractive force to the stationary core 120 against the urging force of the return spring 150. That is, the movable core 140, which is located at the relay-contact off position limited by the limiting member while the air gap AG is the maximum length AGL (see FIG. 1), is pulled by the magnetic attractive force generated by the exciting coil 110, so that the movable core 140 is moved to the stationary core 120 while the air gap AG is reduced (see FIG. 2). Finally, the movable core 140 has been completely moved while the base portion 141 of the movable core 140 is seated onto the inner flange 132b of the yoke assembly 130 (see FIG. 3A). This position of the movable core 140 while the base portion 141 of the movable core 140 is seated onto the inner flange 132b of the yoke assembly 130 will be referred to as a relay-contact turn-on position.

This enables the movable contacts 170 to be respectively contacted to the stationary contacts 160, resulting in electrical power being supplied from the battery to the inverter via the electromagnetic relay device 100A.

In particular, the electromagnetic relay device 100A according to the first embodiment uses a volute spring or a conical spring, which is made of a magnetic material, as the return spring 150. Because the return spring 150 is comprised of a volutely coiled member that provides volutely subsequent coils 150a, the return spring 150 constitutes the magnetic circuit, so that a component of the magnetic flux generated by the exciting coil 110 volutely, i.e. spirally, flows through the volutely subsequent coils 150a of the return spring 150 (see marks M1 and M2). That is, the return spring 150 constitutes a magnetic path between the stationary core 120 and the movable core 150 through which the component of the magnetic flux volutely flows.

Because the volutely coiled return spring 150 has a small diameter in its radial cross section, the magnetic volutely flux flowing through the volutely coiled member of the return spring 150 becomes easily saturated. This causes leakage flux components LF to be leaked out from the volutely coiled member of the return spring 150. In the leakage flux components LF, partial leakage flux components LF act between the coils 150a of the return spring 150 and the stationary core 120 and between the coils 150a of the return spring 150 and the movable core 140. This results in attractive force components AF based on the partial leakage flux components LF being generated between the return spring 150 and the stationary core 120 and between the return spring 150 and the movable core 140 (see FIGS. 1 to 3A). The attractive force components AF further cause the return spring 150 to contract.

Figure 2:
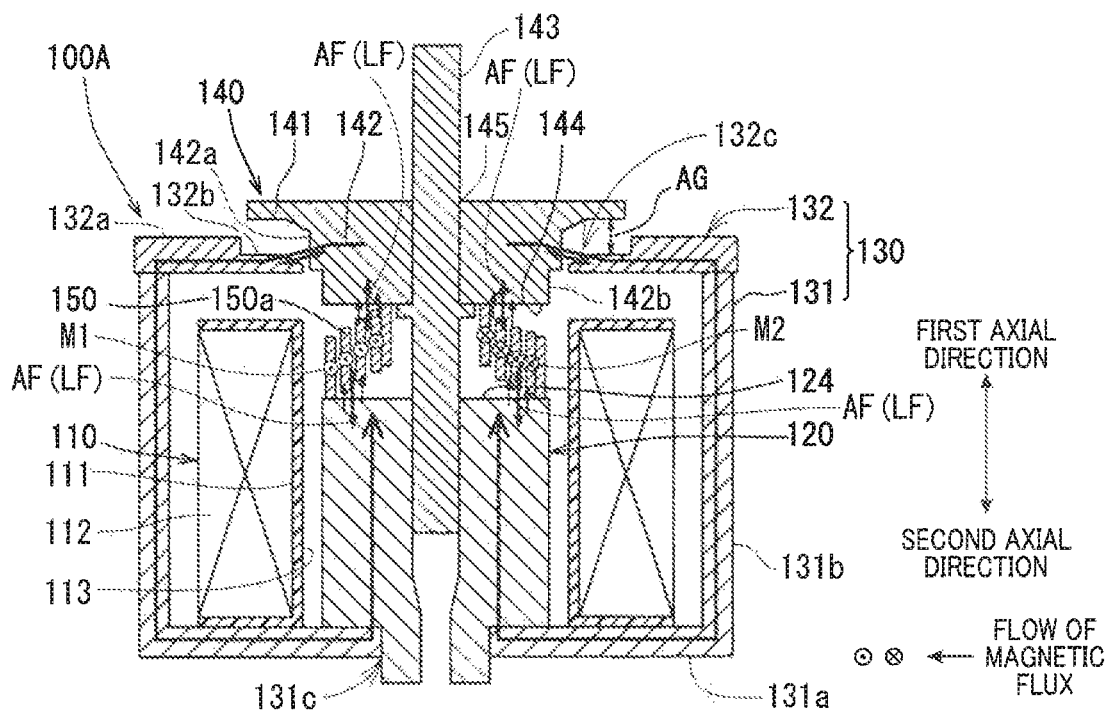
FIG. 2 is an axial cross-sectional view of the electromagnetic relay device while the air gap of the electromagnetic relay device has a medium length according to the first embodiment.

In particular, the volutely subsequent coils 150a of the return spring 150 move toward the stationary core 120 and toward the movable core 140 gradually from the radial outermost coil 150a to the radial innermost coil 150a while the return spring 150 is compressed based on movement of the movable core 140 toward the stationary core 120 (see FIG. 2). This efficiently uses the leakage flux components LF generated from the volutely subsequent coils 150a as the attractive force components AF to magnetically pull the movable core 140 to the stationary core 120. That is, as illustrated in FIG. 3A, when the return spring 150 is fully compressed, all the volutely subsequent coils 150a are abutted onto each of the stationary core 120 and the movable core 140, so that the attractive force components AF based on the leakage flux components LF from all the volutely subsequent coils 150a efficiently pull the movable core 140 to the stationary core 120.

That is, the smaller the air gap AG is, the more closely the coils 150a of the volutely coiled member are spaced, so that the intensities of the partial leakage flux components LF increase, resulting in an increase of the attractive force components AF. This enables apparent reaction force of the return spring 150, i.e. its spring constant, to decrease, resulting in an increase of the pulling force that pulls the movable core 140 to the stationary core 120.

Figure 3B:
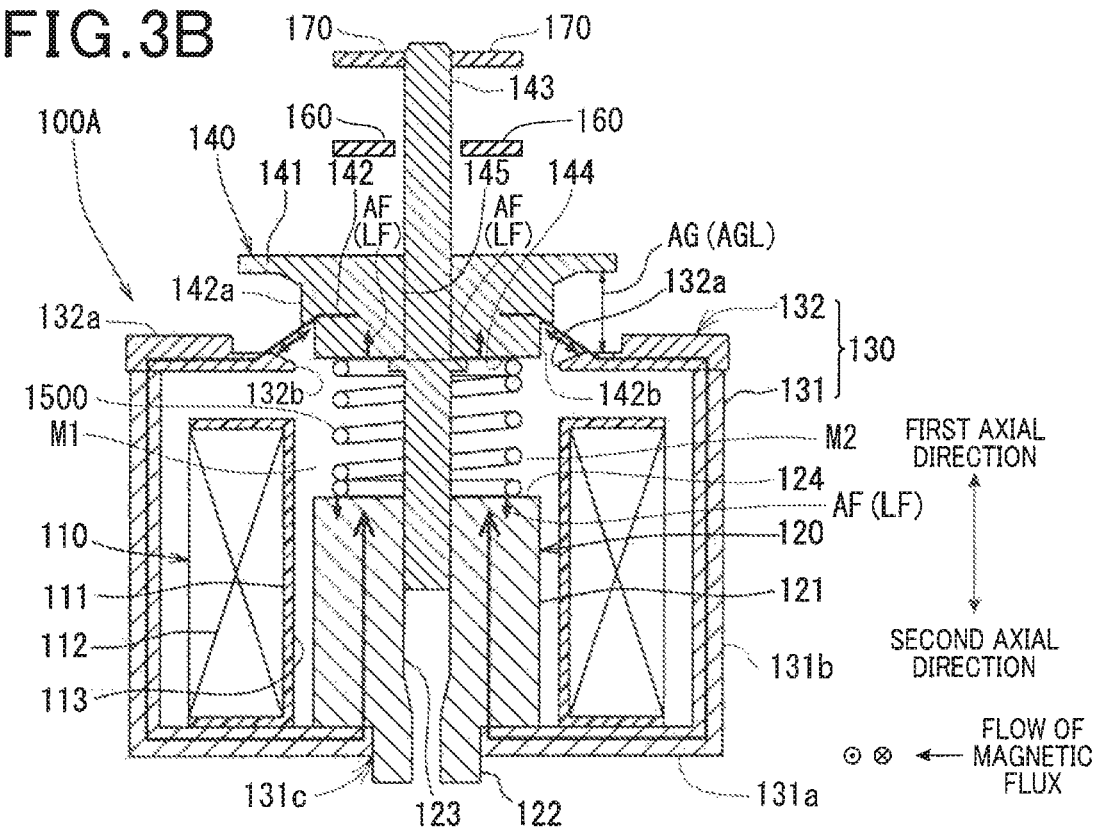
FIG. 3B is an axial cross-sectional view of a modified electromagnetic relay device, which is configured such that a volutely coiled return spring of the electromagnetic relay device according to the first embodiment has been removed with a normal coil spring, while the air gap has a maximum length.
Figure 3C:
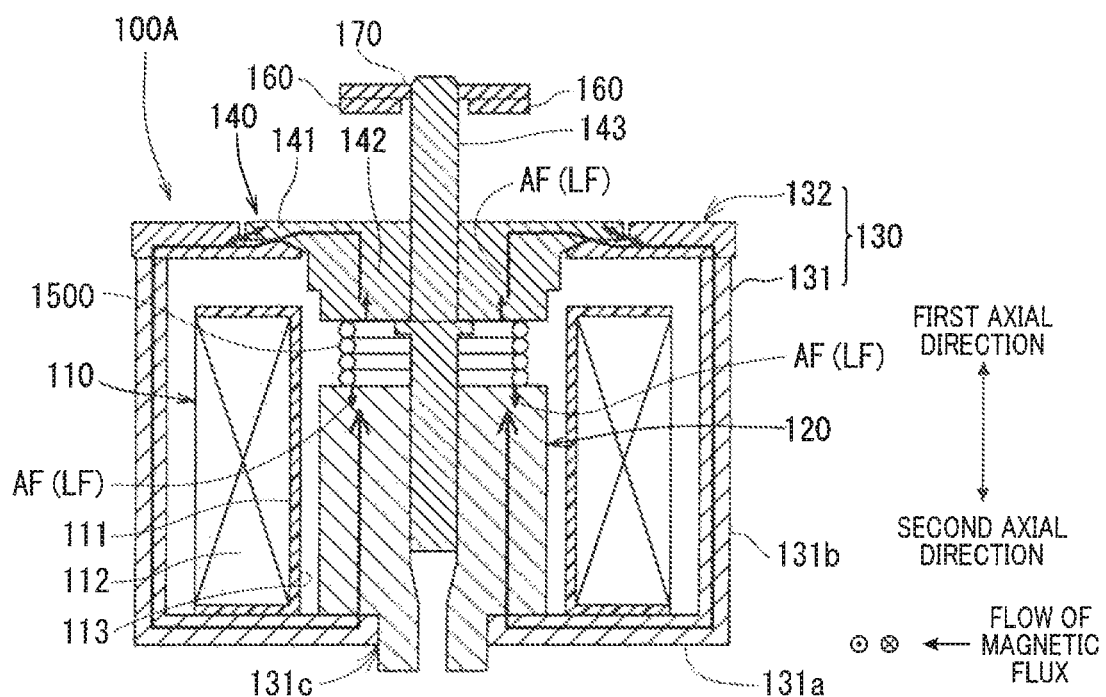
FIG. 3C is an axial cross-sectional view of the modified electromagnetic relay device while the air gap has a minimum length.

In contrast, FIG. 3B illustrates a coil spring 1500 located between the movable core 140 and the stationary core 120 in place of the return spring 150 while the air gap AG has a maximum length, and FIG. 3C illustrates the coil spring 1500 while the air gap AG has a minimum length.

As illustrated in FIGS. 3B and 3C, the axially end coil of the coil spring 1500 in the first axial direction is only abutted onto the movable core 140, and the axially end coil of the coil spring 1500 in the second axial direction is also only abutted onto the stationary core 120. That is, middle coils of the coil spring 1500 in the axial direction are not abutted onto the movable core 140 and the stationary core 120. This may result in leakage flux components from the middle coils of the coil spring 1500 in the axial direction being unlikely to contribute to attractive force components between the coil spring 1500 and each of the movable core 140 and the stationary core 120.

In addition, when the movable core 140 has been completely pulled to the stationary core 120 so that the base portion 141 is seated onto the inner flange 132b, the distance between the stationary core 120 and the movable core 140 in the axial direction of the stationary core 120 is set to be substantially identical to the minimum axial length of the return spring 150 (see FIG. 3A). That is, when the movable core 140 has been completely pulled to the stationary core 120 so that the base portion 141 is seated onto the inner flange 132b, the coils 150a of the return spring 150 contract to be nested within each other to form a substantially tubular shape (see FIG. 3A). This enables all the magnetic flux components to pass through return spring 150 in the axial direction of the return spring 150, i.e. the axial direction of the stationary core 120, resulting in no or little magnetic flux components in radial directions of the stationary core 120.

This prevents radial magnetic force including inward magnetic force, i.e. side force, from acting on the return spring 150, thus reducing inclination of the axial direction of the return spring 150 relative to the axial direction of the stationary core 120.

If the movable core 140 had a main part and a projecting end projecting from the main part and the return spring 150 were mounted to the outer periphery of a main part of the movable core 140 to surround the projecting end of the movable core 140, which will be referred to as a conventional electromagnetic relay device similar to the configuration of the plunger electromagnetic solenoid disclosed in the published patent document, leakage magnetic flux components leaked out from the return spring 150 would inwardly flow toward the projecting end of the movable core 120 located inside the return spring 150 in radial directions of the stationary core 120. This would cause radially inward magnetic force, i.e. side force, to be generated to the return spring 150.

In contrast, the return spring 150 of the electromagnetic relay device 100A according to the first embodiment is located between the facing surface 124 of the stationary core 120 and the facing surface 144 of the movable core 120. This results in reduction of radially inward magnetic force to the return spring 150 as compared with the configuration of the electromagnetic relay device 100A, which is similar to the configuration of the plunger electromagnetic solenoid disclosed in the published patent document.

The electromagnetic relay device 100A according to the first embodiment is configured such that the larger diameter end, i.e. second end, of the return spring 150 is mounted to the facing surface 124 of the stationary core 120, and the smaller diameter end, i.e. first end, of the return spring 150 is mounted to the facing surface 144 of the movable core 140. This configuration enables the minimum distance between the outer periphery of the smaller diameter end of the return spring 150 and the periphery of the inner flange 132b of the second yoke 132 to be longer as compared with the case where the smaller diameter end of the return spring 150 is mounted to the facing surface 124 of the stationary core 120, and the larger diameter end of the return spring 150 is mounted to the facing surface 144 of the movable core 140.

This reduces the number of the leakage flux components LF, which directly flow from the return spring 150 to the yoke 130, i.e. the second yoke 132, without passing through the movable core 140, resulting in a reduction of the number of leakage flux components LF, which do not contribute to the magnetic attractive force components AF.

Figure 4:
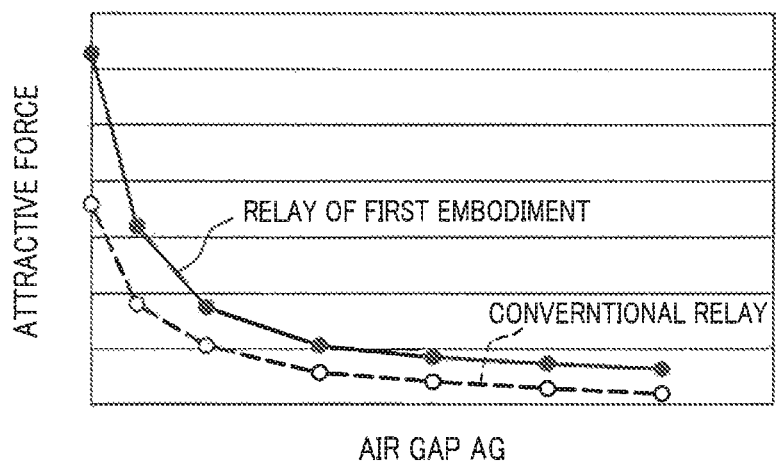
FIG. 4 is a graph schematically illustrating an example of the relationship between magnetic attractive force and the length of the air gap according to the first embodiment.

FIG. 4 schematically illustrates

1. A first example of the relationship between the length of the air gap AG and the magnitude of the magnetic attractive force acting on the movable core 140 in accordance with theoretical analysis in the electromagnetic relay device 100A according to the first embodiment (see solid curve)

2. A second example of the relationship between the length of the air gap AG and the magnitude of the magnetic attractive force acting on the movable core 140 in accordance with theoretical analysis in the conventional electromagnetic relay device (see dashed curve)

FIG. 4 clearly shows that the magnitude of the magnetic attractive force acting on the movable core 140 in the electromagnetic relay device 100A according to the first embodiment is greater than the magnitude of the magnetic attractive force acting on the movable core 140 in the conventional electromagnetic relay device over the whole change range of the air gap AG from 0 mm to the maximum length AGL.

Figure 5:
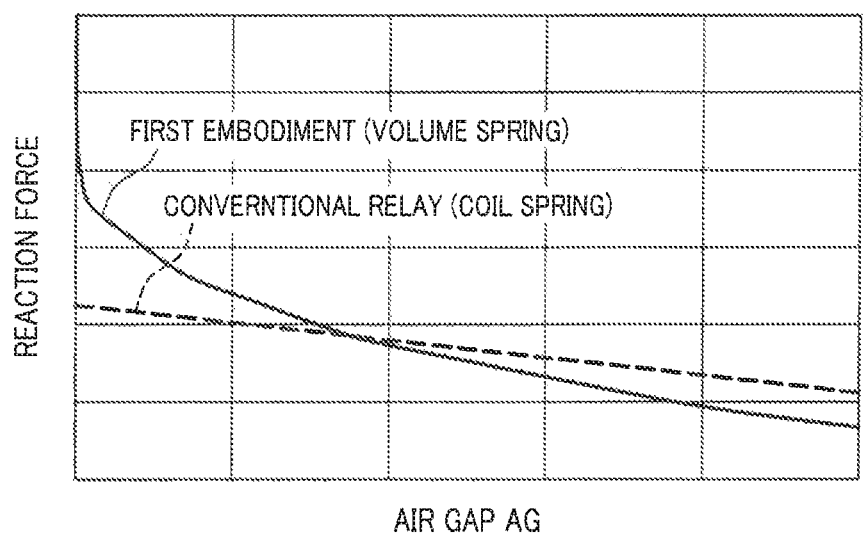
FIG. 5 is a graph schematically illustrating an example of the relationship between reaction force of a return spring and the length of the air gap according to the first embodiment.

FIG. 5 schematically illustrates

1. A first example of the relationship between the length of the air gap AG and the magnitude of the reaction force of the return spring, i.e. volute spring, 150 in the electromagnetic relay device 100A according to the first embodiment (see solid curve)

2. A second example of the relationship between the length of the air gap AG and the magnitude of the reaction force of a normal coil spring in the conventional electromagnetic relay device FIG. 5 shows that the reaction force of the return spring 150 rises rapidly upon the length of the air gap AG being close to zero as compared with the normal spring.

For this reason, the energy stored in the return spring 150 is maximized upon the air gap AG being zero, that is, the movable core 14 having been maximally or fully pulled. The maximized energy stored in the return spring 150 enables the initial velocity of movement of the movable core 140 to the relay-contact turn-off position, at which the stationary contacts 160 and the movable contacts 170 are contacted to each other, to increase. This enables the movable contacts 170 and the stationary contacts 160 to be separated faster, making it possible to change the contact mechanism from an on state to an off state faster. That is, it is possible to improve the capability of reducing the lifetime of an arc discharged when the contact mechanism is turned off urgently.

Note that, in the plunger electromagnetic solenoid disclosed in the published patent document, the outer periphery of the first end of the movable core is tapered inwardly, and the groove of the stationary core also has the inwardly tapered inner periphery conforming to the tapered outer periphery of the first end of the movable core. This may cause magnetic attractive force, which crosses the tapered outer periphery and tapered inner periphery, to be generated upon the exciting coil being energized. That is, the generated magnetic attractive force has force components directed in parallel to the corresponding radial directions of the stationary core. That is, these force components, whose directions are parallel to the corresponding radial directions of the stationary core, may become radially inward magnetic force components.

In contrast, the stationary core 120 has the flat facing surface 124 without having an inwardly tapered inner periphery, and the movable core 140 has the facing surface 144 without having an inwardly tapered outer periphery. This prevents radially inward magnetic force from being generated due to the tapered outer and inner peripheries.

Second Embodiment

Figure 6:
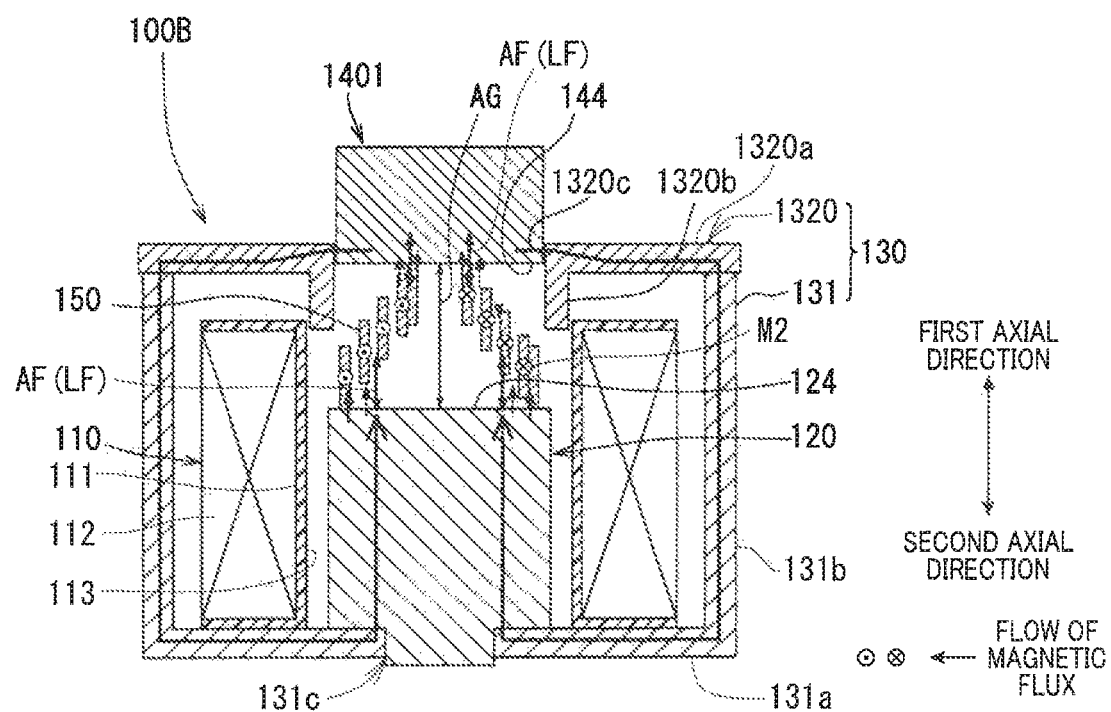
FIG. 6 is an axial cross-sectional view of an electromagnetic relay device while an air gap of the electromagnetic relay device has a maximum length according to the second embodiment of the present disclosure.
Figure 7:
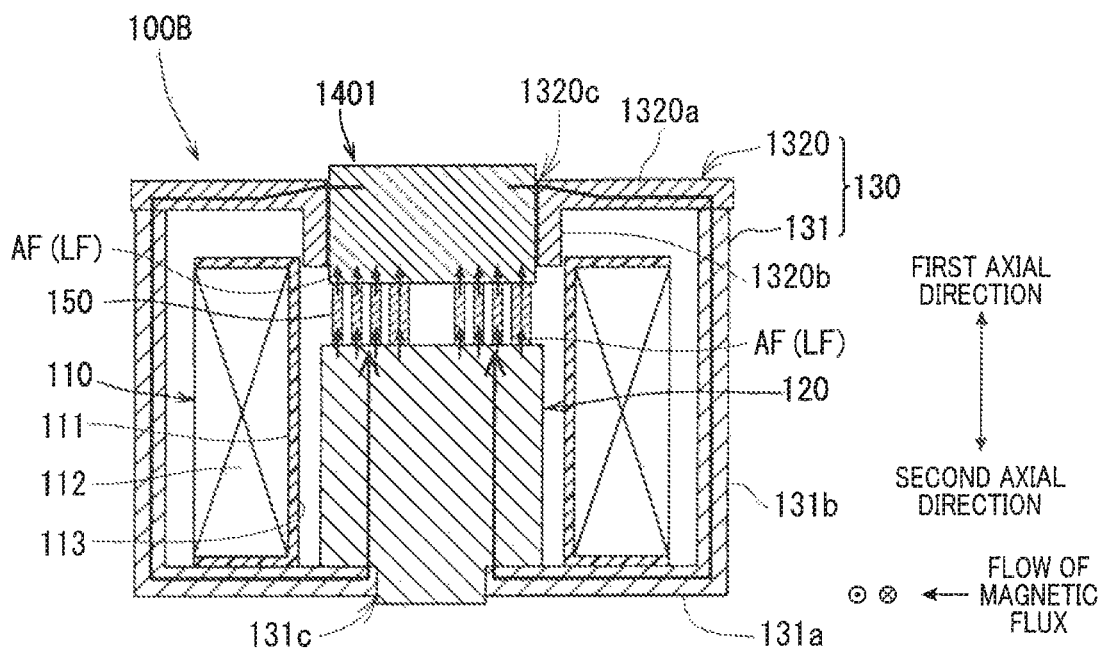
FIG. 7 is an axial cross-sectional view of the electromagnetic relay device while the air gap of the electromagnetic relay device has a minimum length according to the second embodiment.

The following describes the second embodiment of the present disclosure with reference to FIGS. 6 and 7. The second embodiment differs from the first embodiment in the following points. So, the following mainly describes the different points, and omits or simplifies descriptions of like parts between the first and second embodiments, to which identical or like reference characters are assigned, thus eliminating redundant description.

Referring to FIGS. 6 and 7, an electromagnetic relay device 100B according to the second embodiment is designed as a plunger electromagnetic relay device, and includes a movable core 1401 in place of the movable core 140 as compared with the configuration of the electromagnetic relay device 100A.

As illustrated in FIGS. 6 and 7, the yoke assembly 130 includes a second yoke 1320, which is different from the second yoke 132. The second yoke 1320 is comprised of an annular base plate 1320a, whose inner periphery extends in the second axial direction by a predetermined length to constitute a guide member 1320b. The yoke assembly 130 also includes a yoke hole 1320c defined around the inner periphery, i.e. the guide member 1320b, of the yoke assembly 130.

The movable core 1401 has a cylindrical shape without including the base portion 141, the projecting portion 142, and the shaft 143. The movable core 1401 has opposing first and second flat circular end surfaces. The second circular end surface constitutes the facing surface 144 faces the facing surface 124 of the stationary core 120.

The movable core 1401 is arranged through the yoke hole 1320c to face the stationary core 120, and is configured to be movable in the axial direction of the yoke assembly 130 while being guided by the guide member 1320b.

That is, the electromagnetic relay device 100B includes the return spring, i.e. volute spring, 150 interposed between the facing surface 144 of the movable core 1401 and the facing surface 124 of the stationary core 120, which is similar to the electromagnetic relay device 100A.

Specifically, as illustrated in FIG. 6, upon the exciting coil 112 being deenergized, the movable core 1401 is moved in the first axial direction by the biasing force of the return spring 150, so that the air gap AG between the facing surfaces 124 and 144 has the maximum length AGL.

In contrast, as illustrated in FIG. 7, when the exciting coil 112 is energized, the movable core 1401 is pulled to the stationary core 120 based on the magnetic attractive force generated by the exciting coil 112 and the magnetic attractive force generated based on the leakage flux components LF against the biasing force of the return spring 150. This results in the return spring 150 being fully, i.e. maximally, compressed to have a tubular shape.

For this reason, the electromagnetic relay device 100B obtains the substantially identical technical effects as the technical effects obtained by the electromagnetic relay device 100A.

Note that, in the plunger electromagnetic relay disclosed in the published patent document, because the movable core and the stationary core are magnetically coupled to each other via the coil spring, the magnetic attractive force generated between the movable core and the stationary core may be reduced.

In contrast, the electromagnetic relay device 100B uses the leakage flux components LF to thereby generate the attractive force components LF between the return spring 150 and the stationary core 120 and between the return spring 150 and the movable core 1401. This therefore maintains the magnetic attractive force between the stationary core 120 and the movable core 1401.

Third Embodiment

Figure 8:
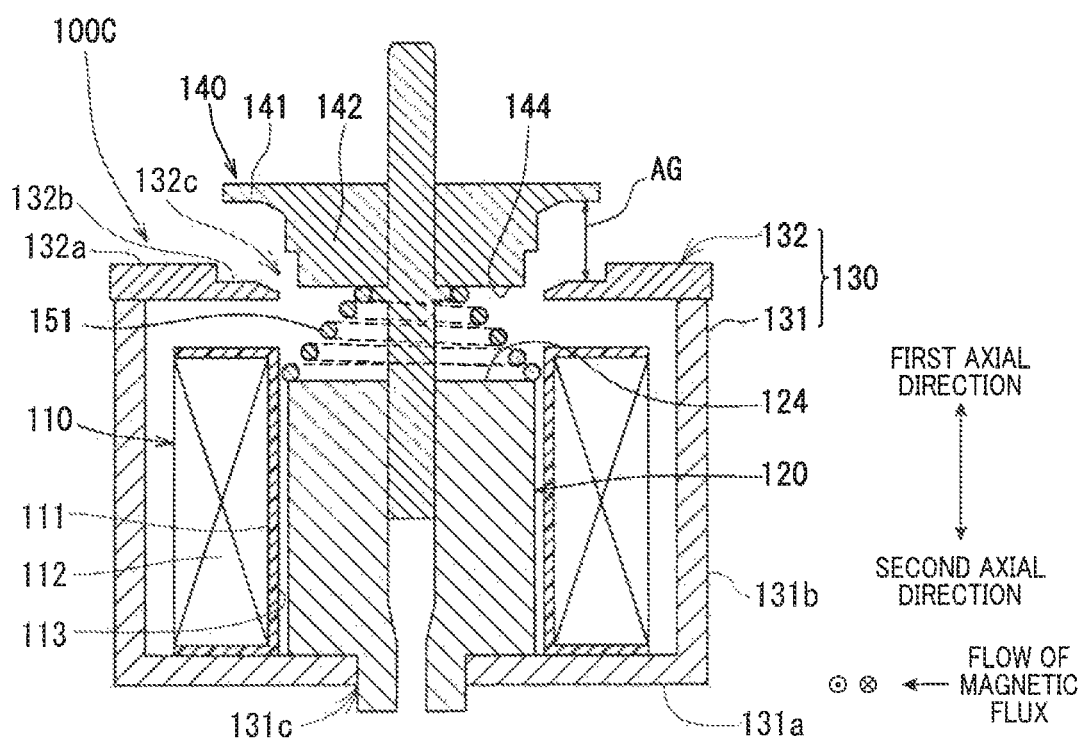
FIG. 8 is an axial cross-sectional view of an electromagnetic relay device while an air gap of the electromagnetic relay device has a maximum length according to the third embodiment of the present disclosure.
Figure 9:
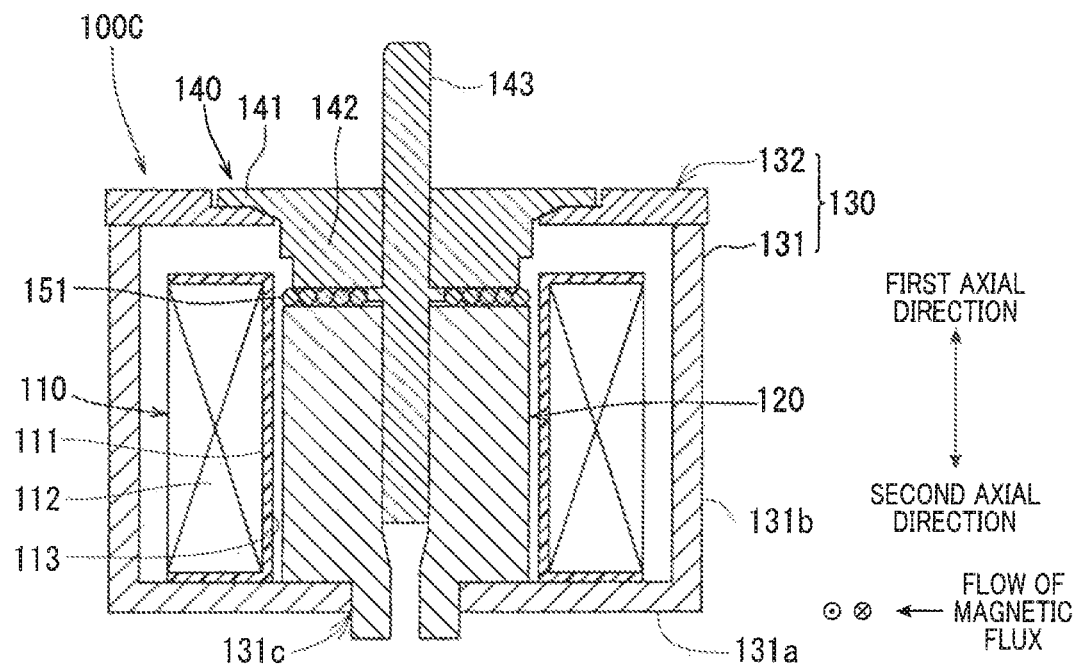
FIG. 9 is an axial cross-sectional view of the electromagnetic relay device while the air gap of the electromagnetic relay device has a minimum length according to the third embodiment.

The following describes the third embodiment of the present disclosure with reference to FIGS. 8 and 9. The third embodiment differs from the first embodiment in the following points. So, the following mainly describes the different points, and omits or simplifies descriptions of like parts between the first and third embodiments, to which identical or like reference characters are assigned, thus eliminating redundant description.

Referring to FIGS. 8 and 9, an electromagnetic relay device 100C according to the third embodiment includes a return spring 151 in place of the return spring 150.

The return spring 151 is configured as a conical coil spring that is a wire magnetic material, which has a substantially circular shape in its lateral cross section, conically wound in its axial direction. That is, the return spring 151 has a cone-shaped with a first end and a second end in its axial direction. The return spring 151 is comprised of a conically coiled member that provide subsequent coils 151a; each subsequent coil 151a of the return spring 151 from the first end to the second end has a larger diameter.

The return spring 151 is coaxially arranged between the facing surface 124 of the movable core 120 and the facing surface 144 of the stationary core 140 such that (1) The first end, which corresponds to the apex of the cone shape and has a smaller diameter than the second end, is abutted onto the facing surface 144

(2) The second end, which corresponds to the bottom of the cone shape and has a larger diameter than the first end, is abutted onto the facing surface 124

The return spring 151 biases the movable core 140 in the first axial direction of the movable core 140 relative to the stationary core 120.

Specifically, as illustrated in FIG. 8, upon the exciting coil 112 being deenergized, the movable core 140 is moved in the first axial direction by the biasing force of the return spring 151, so that the air gap AG between the facing surfaces 124 and 144 has the maximum length AGL.

In contrast, as illustrated in FIG. 9, when the exciting coil 112 is energized, the movable core 140 is pulled to the stationary core 120 based on the magnetic attractive force generated by the exciting coil 112 and the magnetic attractive force generated based on the leakage flux components LF against the biasing force of the return spring 151. This results in the return spring 151 being fully, i.e. maximally, compressed to have a tubular shape. This results in the air gap AG becomes a predetermined minimum length of 0 mm. Upon the air gap AG being 0 mm, the minimum distance between the facing surface 124 of the stationary core 120 and the facing surface 144 of the movable core 140 in the axial direction of the stationary core 120 becomes identical to the length of the fully compressed return spring 151 having the tubular shape.

For this reason, the electromagnetic relay device 100C obtains the substantially identical technical effects as the technical effects obtained by the electromagnetic relay device 100A.

Note that the return spring 151 according to the third embodiment is configured such that a wire magnetic material is conically wound in its axial direction. In contrast, the return spring 150 according to the first embodiment is configured such that a magnetic strip-shaped, thin-walled plate member is volutely wound in its axial direction. For this reason, the contact area of each of the first and second ends of the return spring 151 on the corresponding one of the movable core 140 and stationary core 120 is smaller than the contact area of each of the first and second ends of the return spring 150 on the corresponding one of the movable core 140 and stationary core 120.

On the other hand, the return spring 151 enables the minimum axial length of the fully compressed return spring 151 to be smaller than the minimum axial length of the fully compressed return spring 150. This enables the axial distance between the stationary core 120 and the movable core 140 upon the return spring 151 being fully compressed according to the third embodiment to be shorter than the axial distance between the stationary core 120 and the movable core 140 upon the return spring 150 being fully compressed according to the first embodiment. This therefore reduces a magnetic resistance between the stationary core 120 and the movable core 140, resulting in an increase of the magnetic attractive force.

Note that the return spring 151 can be configured as a conical coil spring that is a wire magnetic material, which has a substantially rectangular shape in its lateral cross section, conically wound in its axial direction. This configuration enables (1) The area of each of the first and second ends of the return spring 151, which faces the corresponding one of the movable and stationary cores 120 and 140, while the return spring 151 is being compressed to be larger than that if the wire magnetic material of the return spring 151 has a substantially circular shape in its lateral cross section (2) The contact area of each of the first and second ends of the return spring 151, which is abutted onto the corresponding one of the movable and stationary cores 120 and 140 upon the return spring 151 being fully compressed to be larger than that if the wire magnetic material of the return spring 151 has a substantially circular shape in its lateral cross section This results in a further increase of the magnetic attractive force.

Fourth Embodiment

Figure 10:
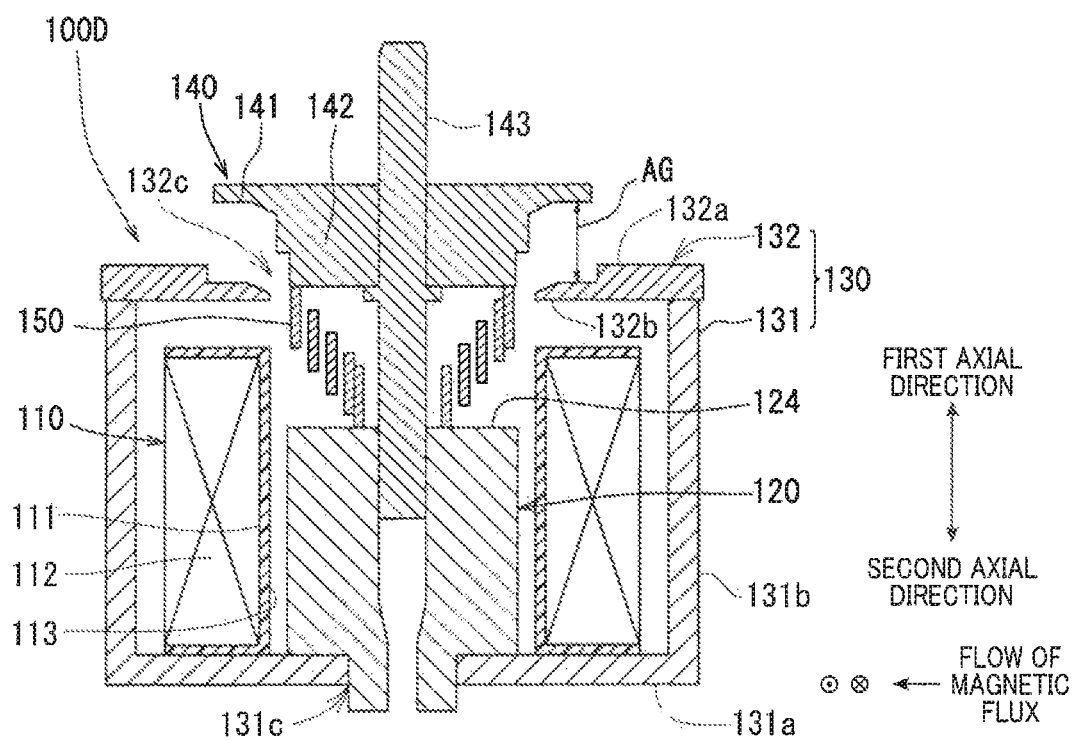
FIG. 10 is an axial cross-sectional view of an electromagnetic relay device while an air gap of the electromagnetic relay device has a maximum length according to the fourth embodiment of the present disclosure.
Figure 11:
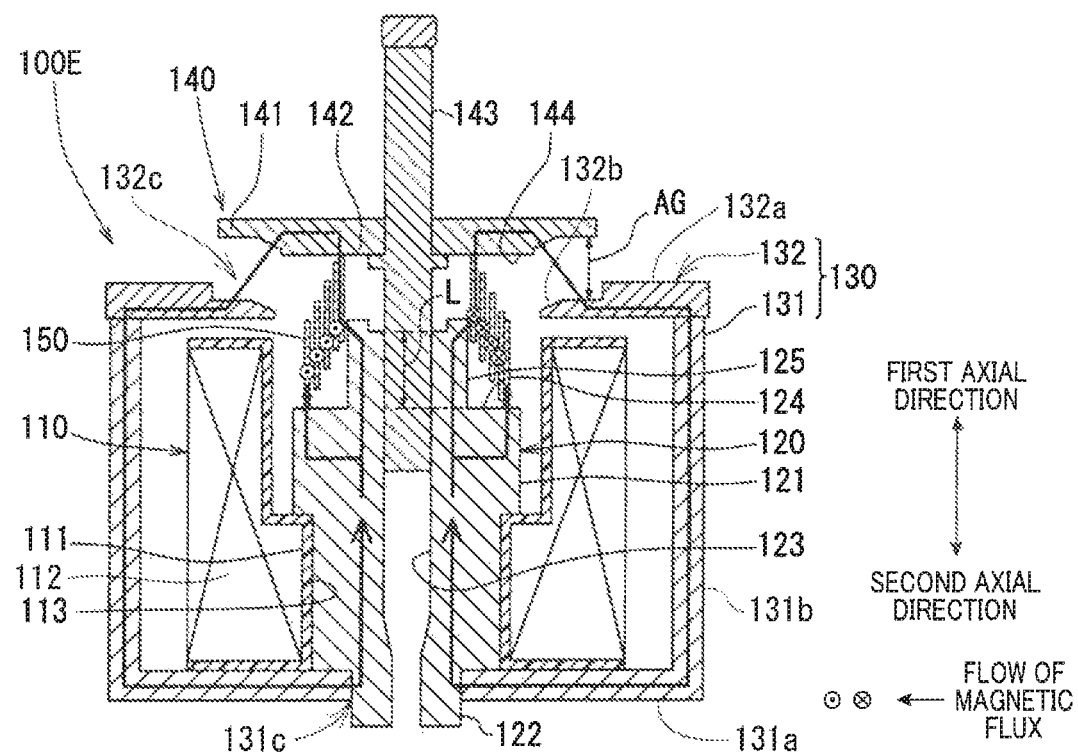
FIG. 11 is an axial cross-sectional view of an electromagnetic relay device while an air gap of the electromagnetic relay device has a maximum length according to the fifth embodiment of the present disclosure.

The following describes the fourth embodiment of the present disclosure with reference to FIGS. 10 and 11. The fourth embodiment differs from the first embodiment in the following points. So, the following mainly describes the different points, and omits or simplifies descriptions of like parts between the first and fourth embodiments, to which identical or like reference characters are assigned, thus eliminating redundant description.

Referring to FIGS. 10 and 11, the return spring 150 of an electromagnetic relay device 100D is arranged such that (1) The first end, which corresponds to the apex of the cone shape and has a smaller diameter than the second end, is abutted onto the facing surface 124 of the stationary core 120

(2) The second end, which corresponds to the bottom of the cone shape and has a larger diameter than the first end, is abutted onto the facing surface 144 of the movable core 140

Because the configuration of the electromagnetic relay device 100D is substantially identical to the configuration of the electromagnetic relay device 100A, the electromagnetic relay device 100D obtains the substantially identical technical effects as the technical effects obtained by the electromagnetic relay device 100A.

Fifth Embodiment

The following describes the fifth embodiment of the present disclosure with reference to FIGS. 11 to 18. The fifth embodiment differs from the first embodiment in the following points. So, the following mainly describes the different points, and omits or simplifies descriptions of like parts between the first and fifth embodiments, to which identical or like reference characters are assigned, thus eliminating redundant description.

Figure 12:
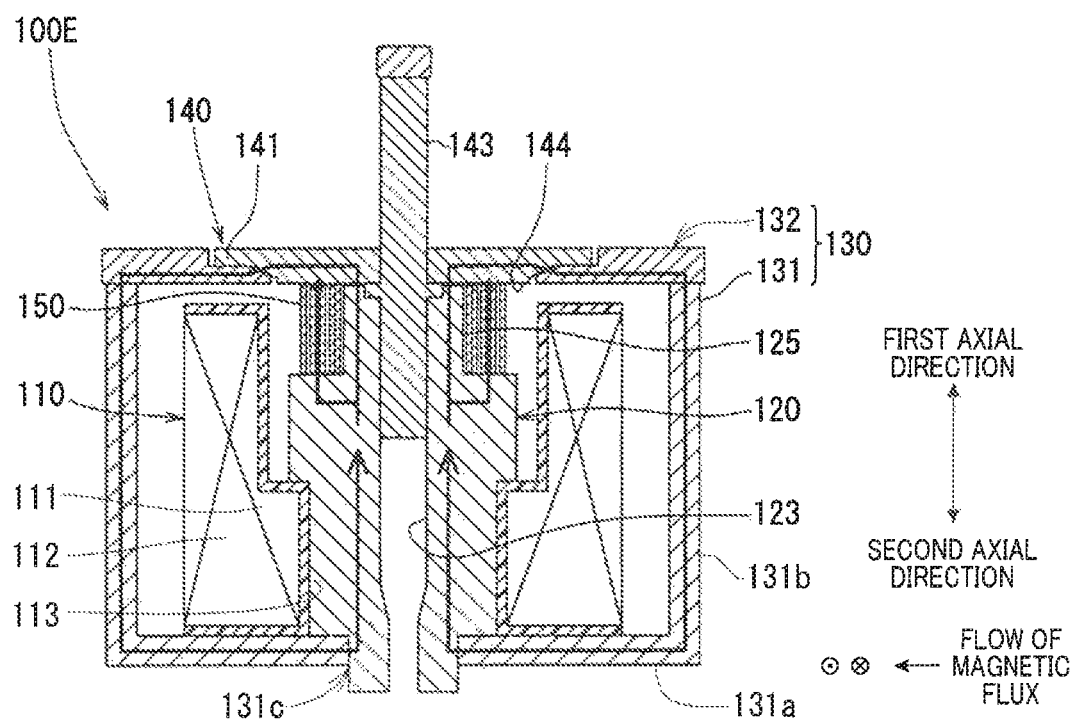
FIG. 12 is an axial cross-sectional view of the electromagnetic relay device while the air gap of the electromagnetic relay device has a minimum length according to the fifth embodiment.
Figure 13:
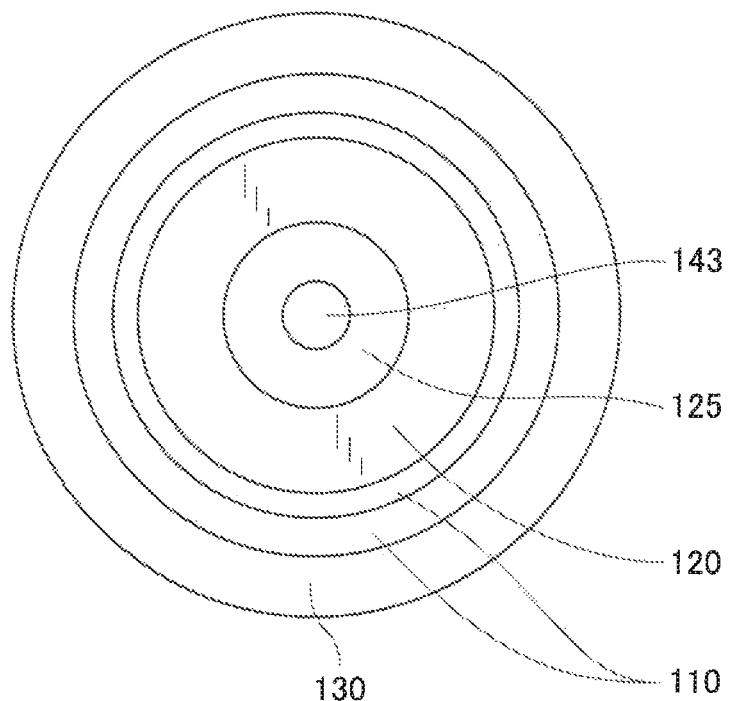
FIG. 13 is a plan view schematically illustrating the electromagnetic relay device when viewed from a first axial direction while a base portion and a projecting portion have been removed from a movable core according to the fifth embodiment.

Referring to FIGS. 11 to 13, a stationary core 120A of an electromagnetic relay device 100E according to the fifth embodiment includes an extension member 125 having a substantially an annular cylindrical shape with an annular shape in its lateral cross section perpendicular to a longitudinal direction of the extension member 125 (see FIG. 13). A part of the extension member 125 is radially located inside the return spring 15, and continuously projects, i.e. extends, from a center portion of the facing surface 124 of the stationary core 120A. The extension member 125 aims to limit radial movement of the return spring 150.

The extension member 125 has an outer diameter slightly smaller than the inner diameter of the first end, i.e. smaller-diameter end, of the return spring 150. The length, referred to as L, of the extension member 125 is previously determined such that, upon the air gap AG having the maximum length AGL (see FIG. 11), the extending end, i.e. the projecting end, which faces the movable core 140, of the extension member 125 is located inside the first end of the return spring 150 (see FIG. 11). This enables, while the movable core 140 is pulled to the stationary core 140 so that the return spring 150 is contracted, the inner periphery of the first end of the return spring 150 to be guided along the outer periphery of the extension member 125. The extension member 125 includes a center hole that has been formed thereinside; the center hole of the projecting member 125 continuously communicates with the center hole 123 of the stationary core 120A. That is, the center hole 123 of the stationary core 120A has an opening that is opened at the surface of the extending end of the extension member 125.

This enables the axial length of the center hole 123 of the stationary core 120A to be larger by the axial length L of the extension member 125 than the axial length of the center hole 123 of the stationary core 120 according to the first embodiment. That is, the length of the center hole 123 in which the second end portion of the shaft 143 is slidably fitted according to the fourth embodiment is larger than the length of the center hole 123 according to the first embodiment.

Specifically, as illustrated in FIG. 11, upon the exciting coil 112 being deenergized, the movable core 140 is moved in the first axial direction by the biasing force of the return spring 150, so that the air gap AG between the facing surfaces 124 and 144 has the maximum length AGL.

In contrast, as illustrated in FIG. 12, when the exciting coil 112 is energized, the movable core 140 is pulled to the stationary core 120 based on the magnetic attractive force generated by the exciting coil 112 and the magnetic attractive force generated based on the leakage flux components LF against the biasing force of the return spring 150. This results in the return spring 150 being fully, i.e. maximally, compressed to have a tubular shape. This results in the air gap AG becomes a predetermined minimum length of 0 mm. Upon the air gap AG being zero, the minimum distance between the facing surface 124 of the stationary core 120 and the facing surface 144 of the movable core 140 in the axial direction of the stationary core 120 becomes identical to the length of the fully compressed return spring 151 having the tubular shape.

In addition, upon the air gap AG being zero, the surface of the extending end of the extension member 125 is abutted on to the facing surface 144 of the movable core 140.

Next, the following describes operations of the electromagnetic relay device 100E and advantageous effects achieved by the electromagnetic relay device 100E.

If there were a radial deviation between the axial direction of the return spring 150 and the axial direction of the movable core 140, there would be misalignment between the axial direction of the return spring 150 and the axial direction of the movable core 140. This would cause the axial direction of the movable 140 to be inclined relative to the axial direction of the movable core 120, resulting in variations in the attractive force components that pull the movable core 140 to the stationary core 120.

From this viewpoint, the electromagnetic relay device 100E is configured such that the extension member 125 of the stationary core 120A enables, while the movable core 140 is pulled to the stationary core 140 so that the return spring 150 is contracted, the inner periphery of the first end of the return spring 150 to be guided along the outer periphery of the extension member 125. This limits movement of the return spring 150, which is being contracted, in the radial directions of the return spring 150, thus reducing a radial deviation between the axial direction of the return spring 150 and the axial direction of the movable core 140.

In addition, the axial length of the center hole 123 of the stationary core 120A is set to be larger by the axial length L of the extension member 125 than the axial length of the center hole 123 of the stationary core 120 according to the first embodiment. That is, the length of the center hole 123 that supports the second end portion of the shaft 143 according to the fourth embodiment is larger by the length L of the extension member 125 than the length of the center hole 123 that supports the second end portion of the shaft 143 according to the first embodiment. This reduces inclination of the shaft 143, that is, inclination of the movable core 140, relative to the axial direction of the stationary core 120.

That is, the electromagnetic relay device 100E reduces variations in the attractive force components that pull the movable core 140 to the stationary core 120.

In addition, upon the air gap AGL having the maximum length AGL (see FIG. 11), magnetic flux, which passes through the extension member 125, increases the amount of magnetic flux flowing from the stationary core 120A to the return spring 150, making it possible to increase the attractive force components AF generated between the stationary core 120A and the return spring 150. An increase of the amount of magnetic flux flowing from the stationary core 120A to the return spring 150 results in an increase of the amount of magnetic flux in the magnetic circuit of the electromagnetic relay device 100E, thus further increasing the magnetic attractive force that pulls the movable core 140 to the stationary core 120A.

On the other hand, upon the air gap AGL having the minimum length of zero (see FIG. 12), because the surface of the extending end of the extension member 125 is abutted on to the facing surface 144 of the movable core 140, magnetic flux components, which directly flow from the extending end of the extension member 125 to the facing surface 144 of the movable core 140. This enables magnetic attractive force to be additionally obtained between the extension member 125 and the movable core 140, thus further increasing the magnetic attractive force that pulls the movable core 140 to the stationary core 120A.

Figure 14:
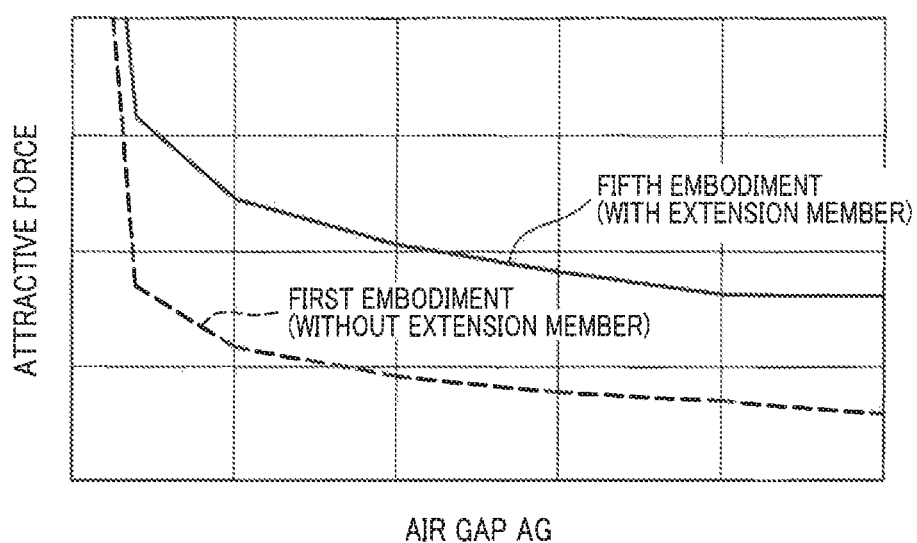
FIG. 14 is a graph schematically illustrating an example of the relationship between magnetic attractive force and the length of the air gap according to the fifth embodiment.
Figure 15:
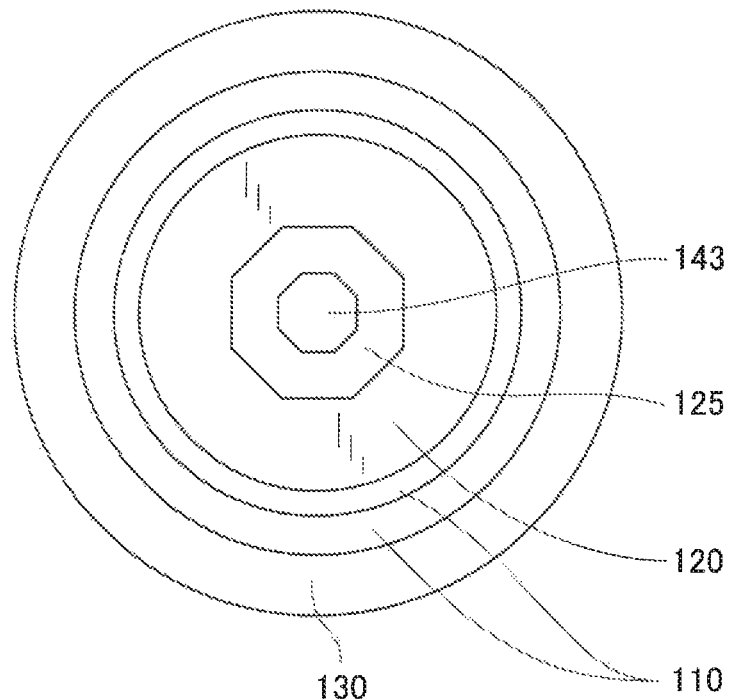
FIG. 15 is a plan view schematically illustrating the electromagnetic relay device when viewed from the first axial direction while the base portion and the projecting portion have been removed from the movable core according to a modification of the fifth embodiment.
Figure 16:
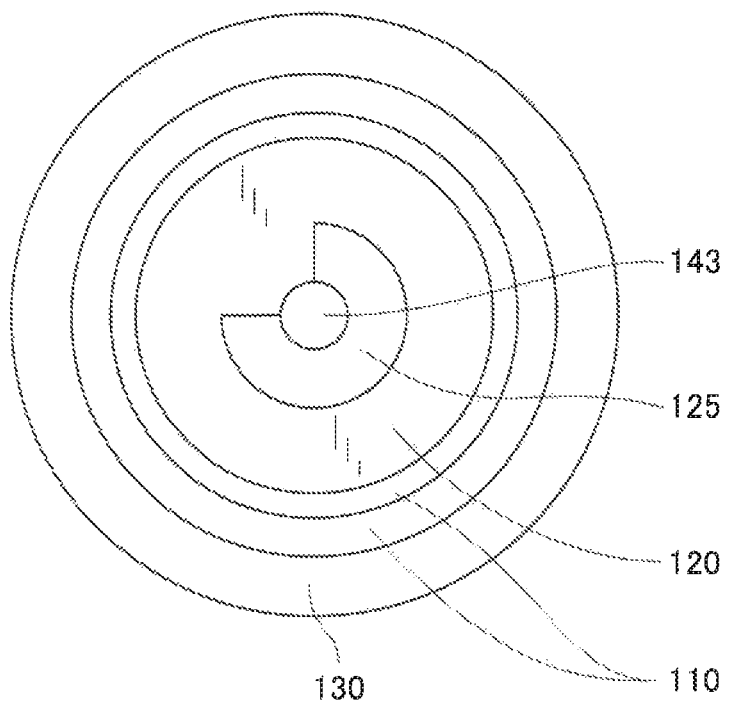
FIG. 16 is a plan view schematically illustrating the electromagnetic relay device when viewed from the first axial direction while the base portion and the projecting portion have been removed from the movable core according to another modification of the fifth embodiment.

FIG. 14 schematically illustrates

1. A first example of the relationship between the length of the air gap AG and the magnitude of the magnetic attractive force acting on the movable core 140 in accordance with theoretical analysis in the electromagnetic relay device 100E, which includes the extension member 125, according to the fifth embodiment (see solid curve)

2. A second example of the relationship between the length of the air gap AG and the magnitude of the magnetic attractive force acting on the movable core 140 in accordance with theoretical analysis in the electromagnetic relay device 100A, which includes no extension members, according to the first embodiment (see dashed curve)

FIG. 14 clearly shows that the magnitude of the magnetic attractive force acting on the movable core 140 in the electromagnetic relay device 100E according to the fifth embodiment is greater than the magnitude of the magnetic attractive force acting on the movable core 140 in the electromagnetic relay device 100A according to the first embodiment over the whole change range of the air gap AG from 0 mm to the maximum length AGL.

Figure 17:
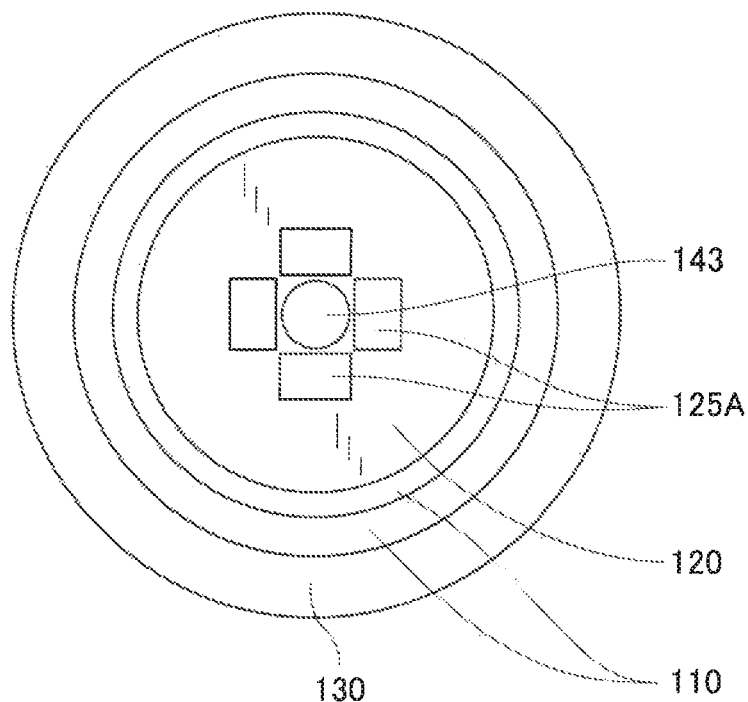
FIG. 17 is a plan view schematically illustrating the electromagnetic relay device when viewed from the first axial direction while the base portion and the projecting portion have been removed from the movable core according to a further modification of the fifth embodiment.

Note that, as described above, the extension member 125 has an annular shape in its lateral cross section when viewed from the first axial direction while the base portion 141 and projecting portion 142 have been removed from the movable core 140 (see FIG. 13). The extension member 125 can be modified to have a polygonal shape in its lateral cross section when viewed from the first axial direction while the base portion 141 and projecting portion 142 have been removed from the movable core 140 (see FIG. 15). The extension member 125 can also be modified to have a substantially ring shape, a part of which has been removed, in its lateral cross section when viewed from the first axial direction while the base portion 141 and projecting portion 142 have been removed from the movable core 140 (see FIG. 16). The extension member 125 can further be modified to include a plurality of extension members 125A that continuously project, i.e. extend, from the center portion of the facing surface 124 of the stationary core 120A, and surrounds the shaft 143. As illustrated in FIG. 17, each of the extension members 125A can have a substantially polygonal shape in its lateral cross section, or a substantially fan shape in its lateral cross section.

The subject matter of the fifth embodiment can be applied to each of the second to fourth embodiments.

Figure 18:
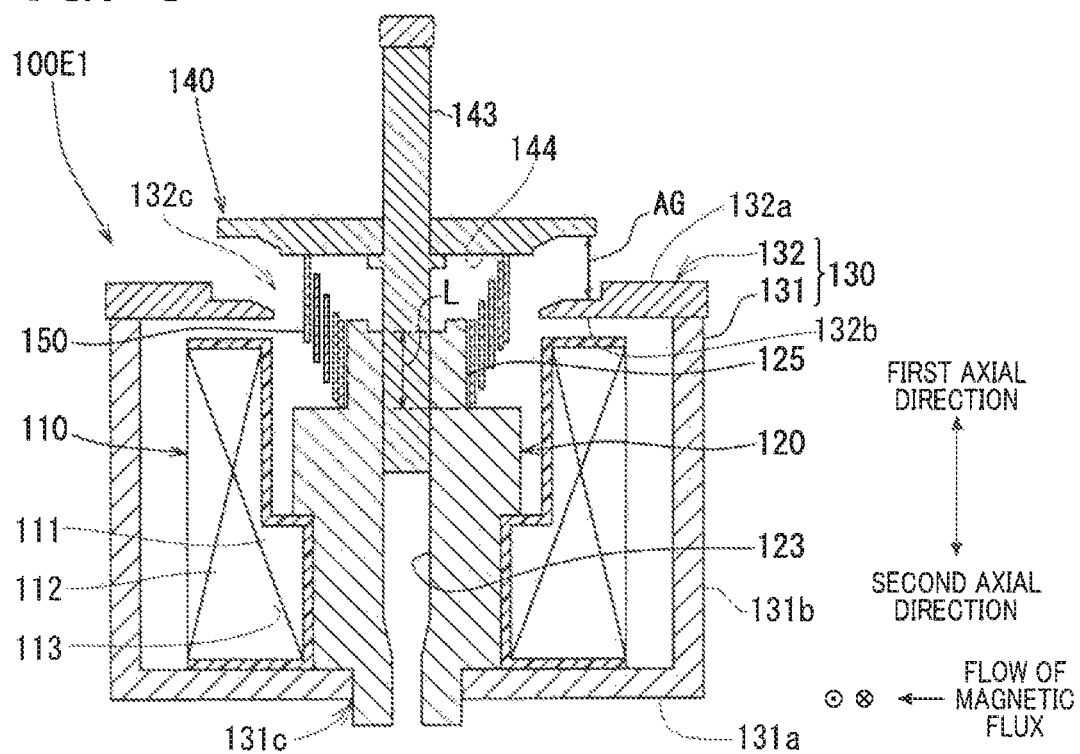
FIG. 18 is an axial cross-sectional view of an electromagnetic relay device according to a still further modification of the fifth embodiment.

FIG. 18 schematically illustrates an electromagnetic relay device 100E1 configured such that the subject matter of the fifth embodiment has been applied to the electromagnetic relay device 100D according to the fourth embodiment (see FIG. 10). As illustrated in FIG. 18, the outer periphery of the extension member 125 and the inner periphery of the return spring 150 are identical to each other, so that the extension member 125 is filled in the first end of the return spring 150. This prevents the return spring 150 from being slidably moved upon the movable core 140 being pulled to the stationary core 140, thus reducing or preventing friction between the extension member 125 and the return spring 150.

Sixth Embodiment

Figure 19:
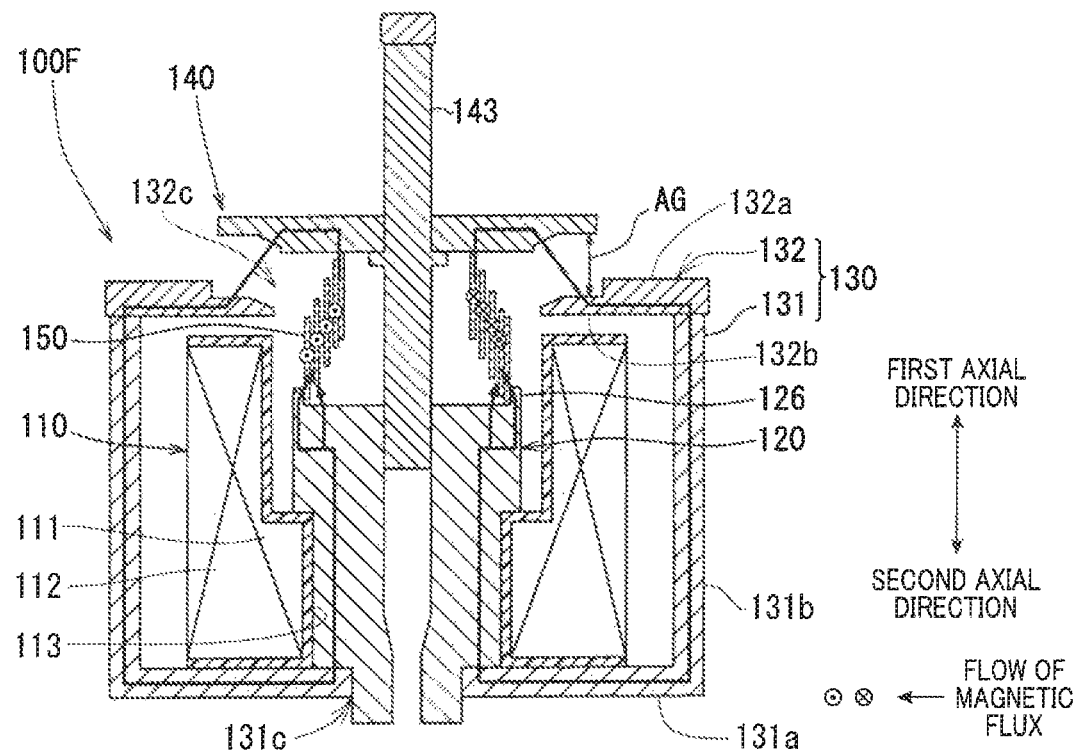
FIG. 19 is an axial cross-sectional view of an electromagnetic relay device while an air gap of the electromagnetic relay device has a maximum length according to the sixth embodiment of the present disclosure.
Figure 20:
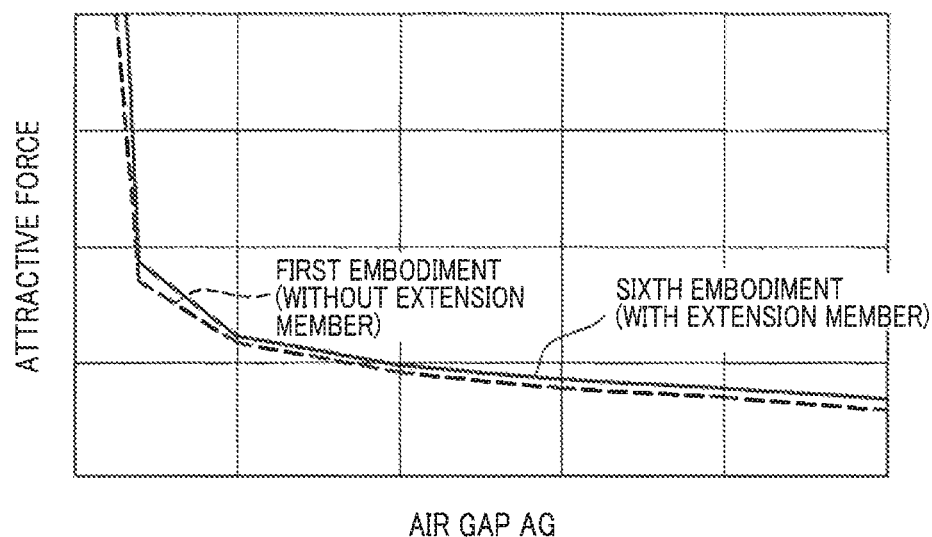
FIG. 20 is a graph schematically illustrating an example of the relationship between magnetic attractive force and the length of the air gap according to the sixth embodiment.

The following describes the sixth embodiment of the present disclosure with reference to FIGS. 19 and 20. The sixth embodiment differs from the fifth embodiment in the following points. So, the following mainly describes the different points, and omits or simplifies descriptions of like parts between the fifth and sixth embodiments, to which identical or like reference characters are assigned, thus eliminating redundant description.

Referring to FIG. 19, a stationary core 120B of an electromagnetic relay device 100F according to the sixth embodiment includes an extension member 126 having a substantially an annular cylindrical shape with an annular shape in its lateral cross section perpendicular to a longitudinal direction of the extension member 126. The extension member 126 continuously projects, i.e. extends, from an outer edge of the facing surface 124 of the stationary core 120B. The extension member 126 aims to limit radial movement of the return spring 150.

The extension member 126 has an inner diameter slightly larger than the outer diameter of the second end, i.e. the larger-diameter end, of the return spring 150. This enables the second end of the return spring 150 to be fitted in the extension member 126, so that axial movement of the outer periphery of the second end of the return spring 150 is guided along the inner periphery of the extension member 126.

Note that, as illustrated in FIGS. 13 and 15 to 17, the extension member 126 can be modified to have a polygonal shape in its lateral cross section or have a substantially ring shape, a part of which has been removed, in its lateral cross section. The extension member 126 can further be modified to include a plurality of extension members that continuously project, i.e. extend, from the facing surface 124 of the stationary core 120B, and surrounds the shaft 143. Each of the extension members can have a substantially polygonal shape in its lateral cross section, or a substantially fan shape in its lateral cross section.

The extension member 126 of the stationary core 120B enables, while the movable core 140 is pulled to the stationary core 120 so that the return spring 150 is contracted, the outer periphery of the second end of the return spring 150 to be guided along the inner periphery of the extension member 126. This limits movement of the return spring 150, which is being contracted, in the radial directions of the return spring 150, thus reducing a radial deviation between the axial direction of the return spring 150 and the axial direction of the movable core 140. This reduces inclination of the shaft 143, that is, inclination of the movable core 140, relative to the axial direction of the stationary core 120, thus reducing variations in the attractive force components that pull the movable core 140 to the stationary core 120.

In addition, upon the air gap AGL having the maximum length AGL (see FIG. 19), magnetic flux, which passes through the extension member 126, increases the amount of magnetic flux flowing from the stationary core 120B to the return spring 150, making it possible to increase the attractive force components AF generated between the stationary core 120B and the return spring 150. An increase of the amount of magnetic flux flowing from the stationary core 120B to the return spring 150 results in an increase of the amount of magnetic flux in the magnetic circuit of the electromagnetic relay device 100F, thus further increasing the magnetic attractive force that pulls the movable core 140 to the stationary core 120B.

FIG. 20 schematically illustrates

1. A first example of the relationship between the length of the air gap AG and the magnitude of the magnetic attractive force acting on the movable core 140 in accordance with theoretical analysis in the electromagnetic relay device 100F, which includes the extension member 126, according to the sixth embodiment (see solid curve)

2. A second example of the relationship between the length of the air gap AG and the magnitude of the magnetic attractive force acting on the movable core 140 in accordance with theoretical analysis in the electromagnetic relay device 100A, which includes no extension members, according to the first embodiment (see dashed curve)

FIG. 20 clearly shows that the magnitude of the magnetic attractive force acting on the movable core 140 in the electromagnetic relay device 100F according to the sixth embodiment is slightly greater than the magnitude of the magnetic attractive force acting on the movable core 140 in the electromagnetic relay device 100A according to the first embodiment over the whole change range of the air gap AG from 0 mm to the maximum length AGL.

The subject matter of the sixth embodiment can be applied to each of the second and third embodiments.

Seventh Embodiment

Figure 21:
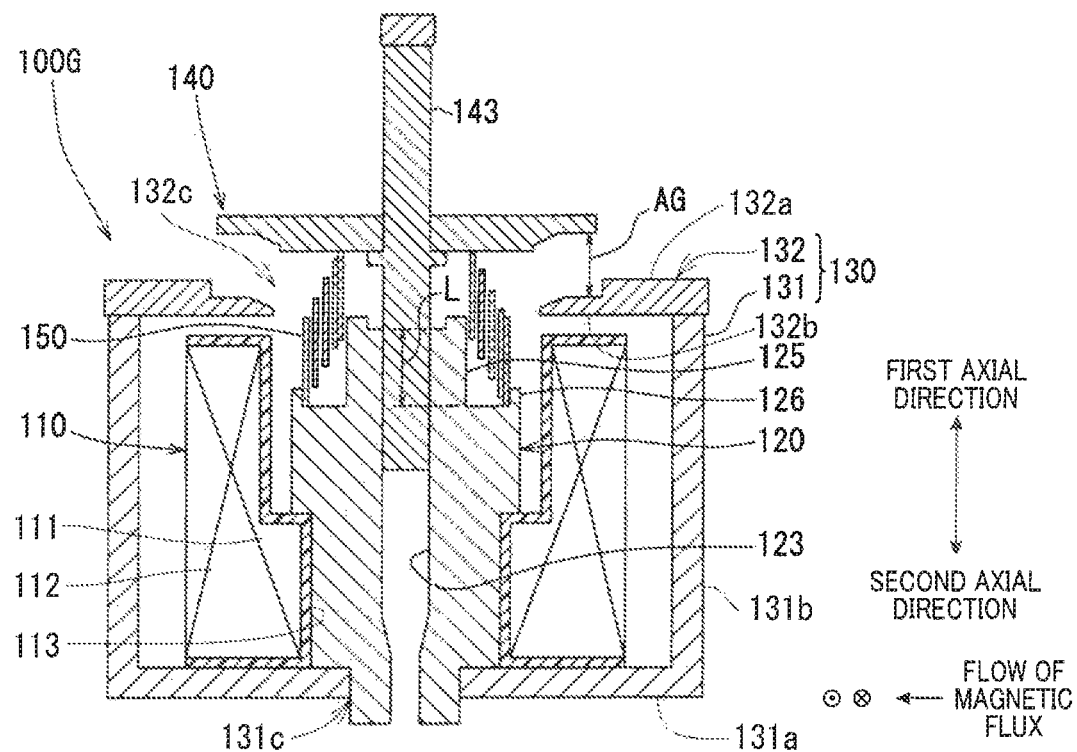
FIG. 21 is an axial cross-sectional view of an electromagnetic relay device while an air gap of the electromagnetic relay device has a maximum length according to the seventh embodiment of the present disclosure.

The following describes the seventh embodiment of the present disclosure with reference to FIG. 21. The seventh embodiment differs from the fifth embodiment in the following points. So, the following mainly describes the different points, and omits or simplifies descriptions of like parts between the fifth and seventh embodiments, to which identical or like reference characters are assigned, thus eliminating redundant description.

Referring to FIG. 21, an electromagnetic relay device 100G according to the seventh embodiment is configured such that the subject matter of the fifth embodiment and the subject matter of the sixth embodiment are combined with each other.

Specifically, a stationary core 120C of the electromagnetic relay device 100G according to the seventh embodiment includes the extension members 125 and 126.

The extension member 125 of the stationary core 120C enables, while the movable core 140 is pulled to the stationary core 140 so that the return spring 150 is contracted, the inner periphery of the first end of the return spring 150 to be guided along the outer periphery of the extension member 125.

Additionally, the extension member 126 of the stationary core 120C enables, while the movable core 140 is pulled to the stationary core 140 so that the return spring 150 is contracted, the outer periphery of the second end of the return spring 150 to be guided along the inner periphery of the extension member 126.

The axial length of the center hole 123 of the stationary core 120C is set to be larger by the axial length L of the extension member 125 than the axial length of the center hole 123 of the stationary core 120 according to the first embodiment.

This more efficiently limits movement of the return spring 150, which is being contracted, in the radial directions of the return spring 150, thus reducing a radial deviation between the axial direction of the return spring 150 and the axial direction of the movable core 140. This reduces inclination of the shaft 143, that is, inclination of the movable core 140, relative to the axial direction of the stationary core 120, thus reducing variations in the attractive force components that pull the movable core 140 to the stationary core 120.

The extension members 125 and 126 also increases the amount of magnetic flux in the magnetic circuit of the electromagnetic relay device 100F, thus further increasing the magnetic attractive force that pulls the movable core 140 to the stationary core 120C.

The subject matter of the seventh embodiment can be applied to each of the second, third, and fourth embodiments.

Eighth Embodiment

Figure 22:
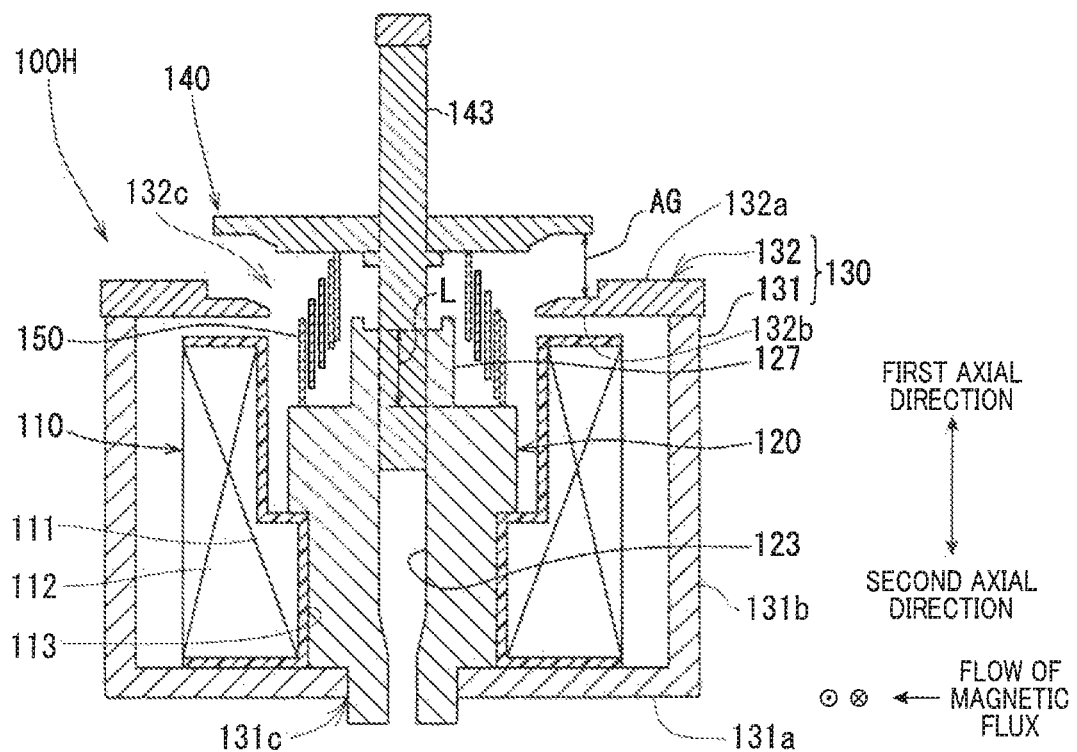
FIG. 22 is an axial cross-sectional view of an electromagnetic relay device while an air gap of the electromagnetic relay device has a maximum length according to the eighth embodiment of the present disclosure.

The following describes the eighth embodiment of the present disclosure with reference to FIG. 22. The eighth embodiment differs from the first embodiment in the following points. So, the following mainly describes the different points, and omits or simplifies descriptions of like parts between the first and eighth embodiments, to which identical or like reference characters are assigned, thus eliminating redundant description.

Referring to FIG. 22, a stationary core 120D of an electromagnetic relay device 100H according to the eighth embodiment includes an extension member 127 having a substantially an annular cylindrical shape with an annular shape in its lateral cross section perpendicular to a longitudinal direction of the extension member 125. The extension member 125 continuously projects, i.e. extends, from the center portion of the facing surface 124 of the stationary core 120D.

The extension member 127 has an outer diameter smaller than the inner diameter of the first end, i.e. smaller-diameter end, of the return spring 150, so that the extension member 127 does not serve to limit radial movement of the return spring 150.

The length, referred to as L, of the extension member 127 is previously determined such that, upon the air gap AG having the maximum length AGL (see FIG. 11), the extending end, i.e. the projecting end, which faces the movable core 140, of the extension member 127 is located inside the first end of the return spring 150 (see FIG. 22). That is, the length of the center hole 123 that supports the second end portion of the shaft 143 according to the eighth embodiment is larger by the length L of the extension member 127 than the length of the center hole 123 that supports the second end portion of the shaft 143 according to the first embodiment. This reduces inclination of the shaft 143, that is, inclination of the movable core 140, relative to the axial direction of the stationary core 120D.

Modifications

The present disclosure is not limited to the above described embodiments, and can be variably modified within the scope of the present disclosure.

In each of the first to eighth embodiments, the corresponding electromagnetic relay device is applied to an inverter for power conversion as a predetermined device, but can be applied to electrical devices, each of which is required to on-off control of an electrical signal or electrical power.

While the illustrative embodiments of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An electromagnetic relay device comprising:
    an exciting coil having opposing first and second ends in an axial direction thereof and configured to generate magnetic flux upon being energized;
    a stationary core coaxially arranged in the exciting coil and constituting a magnetic circuit;
    a yoke arranged to surround an outer periphery of the exciting coil and the second end of the exciting coil to constitute the magnetic circuit, the yoke having an opening that is located to be closer to the first end of the exciting coil than to the second end of the exciting coil, and that faces the stationary core;

a movable core located to face the stationary core via the opening, the movable core being configured to be pulled to the stationary core upon the exciting coil being energized; and a return spring made of a magnetic member that is volutely wound in an axial direction of the stationary core, the return spring constituting the magnetic circuit and being configured to urge the movable core to be separated from the stationary core.

2. The electromagnetic relay device according to claim 1, wherein:

the stationary core has an end surface in the axial direction thereof;

the movable core has an end surface in an axial direction thereof, the end surface of the movable core facing the end surface of the stationary core; and the return spring is arranged between the end surface of the stationary core and the end surface of the movable core.

3. The electromagnetic relay device according to claim 2, wherein:

upon the return spring being fully compressed based on movement of the movable core being pulled to the stationary core, the stationary core and movable core have a distance in the axial direction of the stationary core therebetween, the distance between the stationary core and movable core being substantially identical to a length of the fully compressed return spring in the axial direction of the stationary core.

4. The electromagnetic relay device according to claim 3, wherein:

the return spring has opposing first end and second end in the axial direction thereof, the return spring having a conical shape having a larger diameter from the first end to the second end; and the return spring is arranged such that:
 the first end is abutted onto the end surface of the movable core; and
 the second end is abutted onto the end surface of the stationary core.

5. The electromagnetic relay device according to claim 1, wherein:

the stationary core has an end surface in an axial direction thereof, the end surface of the stationary core facing the movable core; and the stationary core comprises an extension member extending from the end surface of the statuary core toward the movable core, and is configured to limit radial movement of the return spring.

6. The electromagnetic relay device according to claim 5, wherein:

a part of the extension member is located radially inside the return spring.

7. The electromagnetic relay device according to claim 6, wherein:

the extension member has a substantially cylindrical shape.

8. The electromagnetic relay device according to claim 5, wherein:

the extension member has a substantially annular cylindrical shape, and at least part of the return spring is located inside the extension member.

9. The electromagnetic relay device according to claim 5, wherein:

the extension member has a selected one of a substantially circular shape, a substantially polygonal shape, and a substantially ring shape in a cross section perpendicular to an extension direction of the extension member.

10. The electromagnetic relay device according to claim 5, wherein:

the extension member comprises a plurality of extension members each extending from the end surface of the stationary core toward the movable core.

11. The electromagnetic relay device according to claim 1, further comprising:

a shaft mounted to the movable core and extending from the movable core toward the stationary core in an axial direction of the movable core, the shaft having opposing first and second ends, wherein:

the stationary core comprises a hole formed therein, the hole being arranged such that the second end of the shaft is movably fitted in the hole, movement of the shaft through the hole guiding movement of the movable core relative to the stationary core; and the stationary core has an end surface in the axial direction thereof, the end surface of the stationary core facing the movable core; and the stationary core comprises an extension member extending from the end surface of the statuary core toward the movable core and communicating from the hole of the stationary core, the extension member being configured to extend a length of the hole of the stationary core in the axial direction of the stationary core.

12. The electromagnetic relay device according to claim 1, wherein:

the return spring constitutes a magnetic path between the stationary core and the movable core through which a component of the magnetic flux generated by the exciting coil volutely flows.

13. The electromagnetic relay device according to claim 12, wherein:

the return spring is configured such that volute flow of the component of the magnetic flux becomes saturated to cause leakage flux components to be leaked out from the return spring; and the leakage flux components cause magnetic attractive force to be generated between:
 the return spring and the movable core; and
 the return spring and the stationary core.

14. The electromagnetic relay device according to claim 1, wherein:

the return spring comprises volutely subsequent coils; and
the coils of the return spring are configured to contract to be nested within each other to form a substantially tubular shape upon the movable core having been completely pulled to the stationary core.

* * * * *